United States Patent
Nohara

(10) Patent No.: US 12,208,594 B2
(45) Date of Patent: Jan. 28, 2025

(54) LAMINATED GLASS FOR VEHICLES, AND VEHICLE

(71) Applicant: SEKISUI CHEMICAL CO., LTD., Osaka (JP)

(72) Inventor: Atsushi Nohara, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 170 days.

(21) Appl. No.: 17/431,553

(22) PCT Filed: Mar. 18, 2020

(86) PCT No.: PCT/JP2020/011866
§ 371 (c)(1),
(2) Date: Aug. 17, 2021

(87) PCT Pub. No.: WO2020/203278
PCT Pub. Date: Oct. 8, 2020

(65) Prior Publication Data
US 2022/0134714 A1 May 5, 2022

(30) Foreign Application Priority Data
Mar. 29, 2019 (JP) ................................ 2019-065478

(51) Int. Cl.
*B32B 15/04* (2006.01)
*B32B 7/023* (2019.01)
(Continued)

(52) U.S. Cl.
CPC ........ *B32B 17/10633* (2013.01); *B32B 7/023* (2019.01); *B32B 17/10* (2013.01);
(Continued)

(58) Field of Classification Search
CPC .............................................. B32B 17/10651
(Continued)

(56) References Cited

U.S. PATENT DOCUMENTS 4,187,336 A 2/1980 Gordon
5,233,465 A 8/1993 Wheatley
(Continued)

FOREIGN PATENT DOCUMENTS

CN 103619776 3/2014
CN 107433753 12/2017
(Continued)

OTHER PUBLICATIONS

International Preliminary Report on Patentability issued Sep. 28, 2021 in International (PCT) Application No. PCT/JP2020/011866.
(Continued)

*Primary Examiner* — Lauren R Colgan
(74) *Attorney, Agent, or Firm* — Wenderoth, Lind & Ponack, L.L.P.

(57) ABSTRACT

A laminated glass for vehicle is provided. The laminated glass includes an interlayer film having an infrared reflective layer that reflects an infrared ray and having a colored layer containing a coloring agent, and in the laminated glass, it is possible to suppress coloring of the reflected light. The laminated glass for vehicle according to the present invention includes: a first lamination glass member to be arranged at an exterior side of a vehicle; a second lamination glass member to be arranged at an interior side of a vehicle; and an interlayer film arranged between the first lamination glass member and the second lamination glass member, the interlayer film having an infrared reflective layer that reflects an infrared ray and having a colored layer containing a coloring agent, the infrared reflective layer being arranged closer to the second lamination glass member than the colored layer is, and the colored layer being arranged closer to the first lamination glass member than the infrared reflective layer is in the interlayer film. The laminated glass for vehicle
(Continued)

satisfies a specific first configuration or a specific second configuration.

8 Claims, 3 Drawing Sheets

(51) Int. Cl.
*B32B 17/06* (2006.01)
*B32B 17/10* (2006.01)

(52) U.S. Cl.
CPC .. *B32B 17/10036* (2013.01); *B32B 17/10651* (2013.01); *B32B 17/10449* (2013.01); *B32B 2250/04* (2013.01); *B32B 2250/05* (2013.01); *B32B 2250/40* (2013.01); *B32B 2307/4026* (2013.01); *B32B 2307/412* (2013.01); *B32B 2307/416* (2013.01); *B32B 2605/006* (2013.01)

(58) Field of Classification Search
USPC .................................................. 428/426, 428
See application file for complete search history.

(56) References Cited

U.S. PATENT DOCUMENTS

| | | | | |
|---|---|---|---|---|
| 8,137,815 | B2* | 3/2012 | Marumoto | C09J 129/14 428/436 |
| 9,840,068 | B2* | 12/2017 | Nakayama | B32B 17/1066 |
| 2011/0300356 | A1* | 12/2011 | Takamatsu | B32B 17/10761 428/212 |
| 2012/0164409 | A1 | 6/2012 | Masaki | |
| 2014/0093702 | A1* | 4/2014 | Kitajima | B32B 17/10045 65/24 |
| 2015/0168619 | A1* | 6/2015 | Ohmoto | B32B 17/10761 359/359 |
| 2015/0210043 | A1 | 7/2015 | Ohmoto et al. | |
| 2016/0060160 | A1* | 3/2016 | Machida | B32B 17/10688 428/432 |
| 2016/0082697 | A1* | 3/2016 | Hara | C08J 7/044 428/212 |
| 2016/0152007 | A1 | 6/2016 | Tsunoda et al. | |
| 2016/0154153 | A1* | 6/2016 | Tsunoda | G02B 5/208 359/360 |
| 2016/0332424 | A1* | 11/2016 | Yamaguchi | B32B 17/10201 |
| 2017/0341347 | A1* | 11/2017 | Nakamura | B32B 17/1066 |
| 2019/0255814 | A1 | 8/2019 | Ohmoto et al. | |
| 2019/0291389 | A1 | 9/2019 | Yamamoto et al. | |
| 2019/0299569 | A1* | 10/2019 | Yamamoto | C08K 3/04 |
| 2020/0031099 | A1 | 1/2020 | Tsunoda et al. | |
| 2021/0046739 | A1* | 2/2021 | Nohara | B32B 27/285 |
| 2021/0362478 | A1 | 11/2021 | Yamamoto et al. | |

FOREIGN PATENT DOCUMENTS

| | | |
|---|---|---|
| EP | 2 677 352 | 12/2013 |
| JP | 2010-180090 | 8/2010 |
| JP | 2012-218972 | 11/2012 |
| JP | 2015-93434 | 5/2015 |
| JP | 2016-69259 | 5/2016 |
| TW | 201819182 | 6/2018 |
| WO | 2011/019062 | 2/2011 |
| WO | 2012/111715 | 8/2012 |
| WO | 2012/176813 | 12/2012 |
| WO | 2014/021406 | 2/2014 |
| WO | 2014/200108 | 12/2014 |
| WO | 2015/146564 | 10/2015 |
| WO | 2018/025937 | 2/2018 |

OTHER PUBLICATIONS

International Search Report (ISR) issued Jun. 23, 2020 in International (PCT) Application No. PCT/JP2020/011866.
Extended European Search Report issued Nov. 28, 2022 in corresponding European Patent Application No. 20782308.9.

* cited by examiner

[FIG. 1]
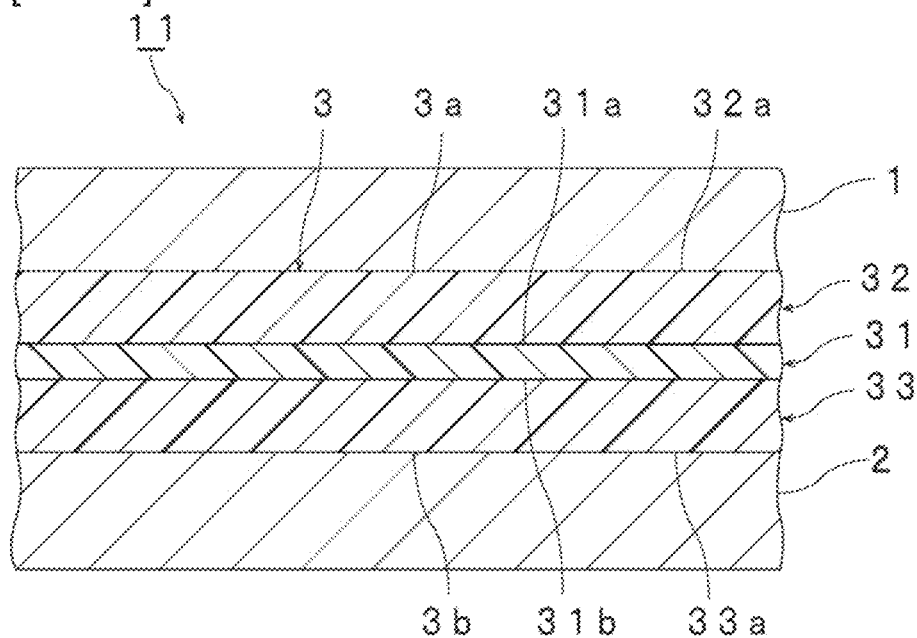
[FIG. 2]
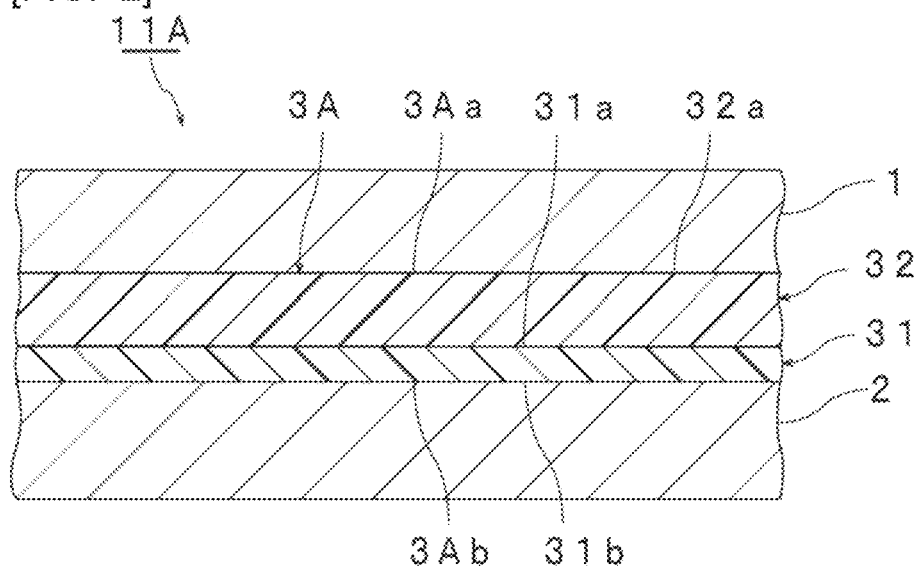

[FIG. 3]
(a)
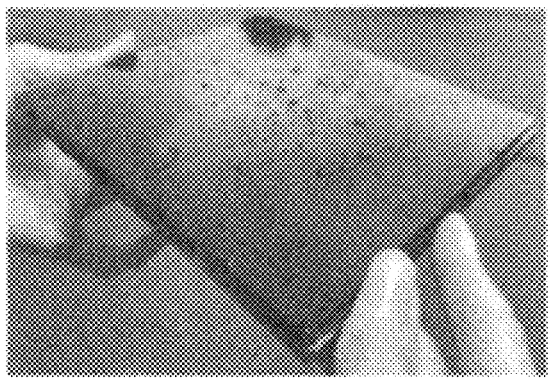
(c)
(b)
(d)
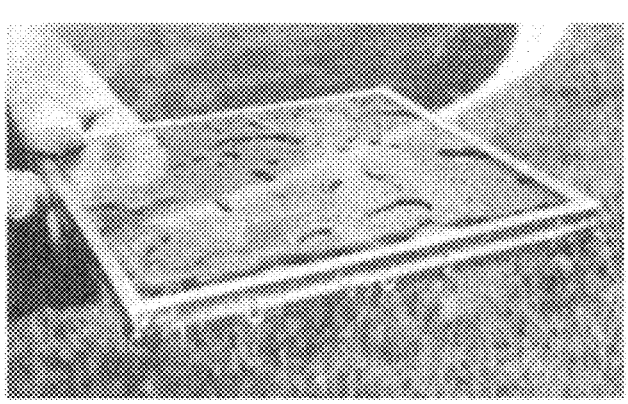

[FIG. 4]
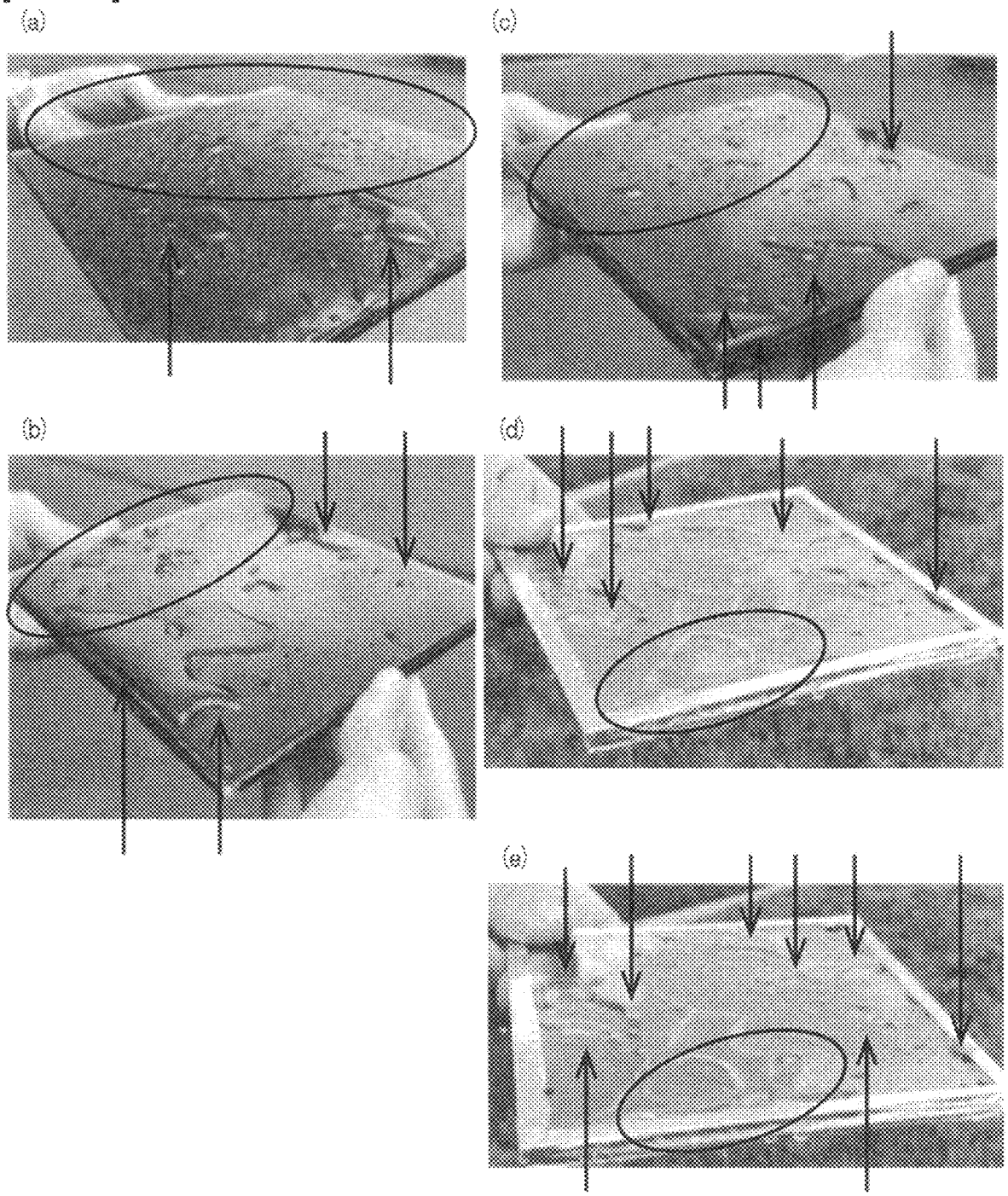

LAMINATED GLASS FOR VEHICLES, AND VEHICLE

TECHNICAL FIELD

The present invention relates to a laminated glass for vehicle that employs an interlayer film. The present invention also relates to a vehicle including the laminated glass for vehicle.

BACKGROUND ART

A laminated glass has excellent safety such that even if a laminated glass is damaged by an external impact, only a small amount of fragments of the glass are scattered. Therefore, such a laminated glass is widely used in automobiles, railroad vehicles, aircraft, ships, buildings, and the like. The laminated glass is produced through sandwiching an interlayer film for laminated glass between two glass plates.

A laminated glass used in vehicles is to have a high heat shielding property. For enhancing the heat shielding property, an interlayer film having an infrared reflective layer is sometimes used.

Patent Documents 1 and 2 below describe a laminated glass in which an interlayer film is arranged between two lamination glass members. The interlayer film has an infrared reflective layer and a resin layer containing a cyanine-based compound as an organic dye. Patent Document 2 describes that the laminated glass is preferably attached so that the infrared reflective layer in the laminated glass is positioned at the outer space side and the resin layer in the laminated glass is positioned at the inner space side.

RELATED ART DOCUMENTS

Patent Documents

Patent Document 1: WO2014/200108A1
Patent Document 2: WO2014/021406A1

SUMMARY OF THE INVENTION

Problems to be Solved by the Invention

When light is reflected on the surface of a laminated glass that includes an interlayer film having an infrared reflective layer that reflects an infrared ray and having a colored layer containing a coloring agent, the reflected light may have coloring of the reflected light such as reddish brown or rainbow color. In particular, when the laminated glass is used in an environment where the background color is dark, such coloring of the reflected light is further emphasized. In particular, for example, when a water droplet adheres to the laminated glass, the color of the water droplet is emphasized by the coloring of the reflected light. As a result, the excellent appearance of the laminated glass may be impaired. Such coloring of the reflected light is generally not a problem in a laminated glass including an interlayer film having no infrared reflective layer, but is a big problem in a laminated glass including an interlayer film having an infrared reflective layer. Such a problem of the coloring of the reflected light is peculiar to the laminated glass including an interlayer film having an infrared reflective layer.

An object of the present invention is to provide a laminated glass for vehicle. The laminated glass includes an interlayer film having an infrared reflective layer that reflects an infrared ray and having a colored layer containing a coloring agent, and in the laminated glass, it is possible to suppress coloring of the reflected light. It is also an object of the present invention to provide a vehicle including the laminated glass for vehicle.

Means for Solving the Problems

According to a broad aspect of the present invention, a laminated glass for vehicle (in the present specification, the term "laminated glass for vehicle" is sometimes abbreviated as "laminated glass") is provided that includes: a first lamination glass member to be arranged at an exterior side of a vehicle; a second lamination glass member to be arranged at an interior side of a vehicle; and an interlayer film arranged between the first lamination glass member and the second lamination glass member, the interlayer film having an infrared reflective layer that reflects an infrared ray and having a colored layer containing a coloring agent, the infrared reflective layer being arranged closer to the second lamination glass member than the colored layer is, and the colored layer being arranged closer to the first lamination glass member than the infrared reflective layer is in the interlayer film. The laminated glass for vehicle satisfies a first configuration or a second configuration described below.

In the first configuration, when the colored layer is sandwiched between two layers of clear glass to obtain a laminate, the colored layer satisfies both a configuration A and a configuration B described below.

In the configuration A, the laminate has an absorbance represented by $A_{650}$ at a wavelength of 650 nm, an absorbance represented by $A_{550}$ at a wavelength of 550 nm, and an absorbance represented by $A_{450}$ at a wavelength of 450 nm so that values of $A_{650}/A_{550}$, $A_{650}/A_{450}$, and $A_{550}/A_{450}$ are each 0.6 or more and 1.4 or less.

In the configuration B, the laminate has a visible light transmittance of 82% or less.

In the second configuration, the colored layer contains carbon black as the coloring agent.

In a specific aspect of the laminated glass according to the present invention, the laminated glass satisfies the first configuration.

In a specific aspect of the laminated glass according to the present invention, the laminated glass satisfies the second configuration.

In a specific aspect of the laminated glass according to the present invention, the colored layer contains a thermoplastic resin.

In a specific aspect of the laminated glass according to the present invention, the interlayer film has a resin layer containing a thermoplastic resin, and the resin layer is arranged closer to the second lamination glass member than the infrared reflective layer is in the interlayer film.

In a specific aspect of the laminated glass according to the present invention, the laminated glass has a portion in which the laminated glass for vehicle has an absorbance represented by $A_{650}'$ at a wavelength of 650 nm, an absorbance represented by $A_{550}'$ at a wavelength of 550 nm, and an absorbance represented by $A_{450}'$ at a wavelength of 450 nm so that values of $A_{650}'/A_{550}'$, $A_{650}'/A_{450}'$, and $A_{550}'/A_{450}'$ are each 0.6 or more and 1.4 or less, the portion having a plane area of 30% or more of 100% of a total plane area of the laminated glass for vehicle.

In a specific aspect of the laminated glass according to the present invention, the laminated glass for vehicle has an absorbance represented by $A_{650}'$ at a wavelength of 650 nm, an absorbance represented by $A_{550}'$ at a wavelength of 550 nm, and an absorbance represented by $A_{450}'$ at a wavelength of 450 nm so that values of $A_{650}'/A_{550}'$, $A_{650}'/A_{450}'$, and $A_{550}'/A_{450}'$ are each 0.6 or more and 1.4 or less at a center along a longitudinal axis and at a center along a transverse axis of the laminated glass for vehicle.

In a specific aspect of the laminated glass according to the present invention, the laminated glass has a protruded surface, and the protruded surface is an outer surface of the first lamination glass member.

According to a broad aspect of the present invention, a vehicle is provided that includes a vehicle body and the above-described laminated glass for vehicle.

Effect of the Invention

The laminated glass for vehicle according to the present invention includes a first lamination glass member to be arranged at an exterior side of a vehicle, a second lamination glass member to be arranged at an interior side of a vehicle, and an interlayer film arranged between the first lamination glass member and the second lamination glass member. In the laminated glass for vehicle according to the present invention, the interlayer film has an infrared reflective layer that reflects an infrared ray and a colored layer containing a coloring agent. In the interlayer film, the infrared reflective layer is arranged closer to the second lamination glass member than the colored layer is, and the colored layer is arranged closer to the first lamination glass member than the infrared reflective layer is. The laminated glass for vehicle according to the present invention satisfies the first configuration or the second configuration. The laminated glass for vehicle according to the present invention has the above-described configurations, and therefore, it is possible to suppress coloring of the reflected light in the laminated glass that includes an interlayer film having an infrared reflective layer that reflects an infrared ray and having a colored layer containing a coloring agent.

BRIEF DESCRIPTION OF DRAWINGS

FIG. 1 is a sectional view schematically showing a laminated glass for vehicle according to a first embodiment of the present invention.

FIG. 2 is a sectional view schematically showing a laminated glass for vehicle according to a second embodiment of the present invention.

FIGS. 3(a), 3(b), 3(c), and 3(d) are photographs showing observation results of laminated glasses for vehicle obtained in examples.

FIGS. 4(a), 4(b), 4(c), 4(d), and 4(e) are photographs showing observation results of laminated glasses for vehicle obtained in comparative examples.

MODES FOR CARRYING OUT THE INVENTION

Hereinafter, details of the present invention will be described.

The laminated glass for vehicle according to the present invention (hereinafter, sometimes abbreviated as "laminated glass") includes a first lamination glass member to be arranged at an exterior side of a vehicle, a second lamination glass member to be arranged at an interior side of a vehicle, and an interlayer film arranged between the first lamination glass member and the second lamination glass member.

In the laminated glass according to the present invention, the interlayer film has an infrared reflective layer that reflects an infrared ray and a colored layer containing a coloring agent. In the laminated glass according to the present invention, the infrared reflective layer is arranged closer to the second lamination glass member than the colored layer is, and the colored layer is arranged closer to the first lamination glass member than the infrared reflective layer is in the interlayer film.

The laminated glass according to the present invention satisfies a first configuration or a second configuration described below.

In the first configuration, when the colored layer is sandwiched between two layers of clear glass to obtain a laminate, the colored layer satisfies both a configuration (A) and a configuration (B) described below.

In the configuration (A), the laminate has an absorbance represented by $A_{650}$ at a wavelength of 650 nm, an absorbance represented by $A_{550}$ at a wavelength of 550 nm, and an absorbance represented by $A_{450}$ at a wavelength of 450 nm so that values of $A_{650}/A_{550}$, $A_{650}/A_{450}$, and $A_{550}/A_{450}$ are each 0.6 or more and 1.4 or less.

In the configuration (B), the laminate has a visible light transmittance of 82% or less.

In the second configuration, the colored layer contains carbon black as the coloring agent.

The laminated glass for vehicle according to the present invention has the above-described configurations, and therefore, it is possible to suppress coloring of the reflected light in the laminated glass that includes an interlayer film having an infrared reflective layer that reflects an infrared ray and having a colored layer containing a coloring agent. In the laminated glass for vehicle according to the present invention, the excellent appearance of the laminated glass can be enhanced.

In the laminated glass for vehicle according to the present invention, it is possible to suppress coloring of the reflected light even when the laminated glass is used in an environment where the background color is dark. In the laminated glass for vehicle according to the present invention, coloring of the reflected light is thus suppressed, and therefore, even when a water droplet is adhered to the laminated glass, it is possible to suppress coloring of the water droplet. Therefore, in the laminated glass for vehicle according to the present invention and in a vehicle including the laminated glass, the excellent appearance can be enhanced even at night or in rainy weather.

The laminated glass according to the present invention has a structure of (an exterior side of a vehicle) a first lamination glass member/a colored layer/an infrared reflective layer/a second lamination glass member (an interior side of a vehicle). The infrared reflective layer and the colored layer are included in the interlayer film, so that the interlayer film has an at least two-layer structure. The interlayer film may have a two or more-layer structure, may have a three-layer structure, or may have a three or more-layer structure. The interlayer film may have a resin layer containing a thermoplastic resin in addition to the infrared reflective layer and the colored layer. The laminated glass according to the present invention may have a structure of, for example, (an exterior side of a vehicle) a first lamination glass member/a colored layer/an infrared reflective layer/a resin layer/a second lamination glass member (an interior side of a vehicle).

In a vehicle, the laminated glass according to the present invention can be attached in an opening between the exterior side of the vehicle (outer space) and the interior side of the vehicle (inner space) in which a heat ray is incident from the exterior side of the vehicle so that the first lamination glass member is positioned at the exterior side of the vehicle. In this case, a heat ray such as sunlight is sufficiently reflected by the infrared reflective layer. Therefore, in the laminated glass according to the present invention, the heat shielding property can be enhanced.

The laminated glass according to the present invention satisfies the above-described first configuration or second configuration. The laminated glass according to the present invention may satisfy the first configuration, may satisfy the second configuration, or may satisfy both the first configuration and the second configuration.

With the laminated glass according to the present invention having the first configuration, an effect of the present invention can be exhibited.

In the first configuration, the clear glass used in preparation of the laminate preferably has a thickness of 2.5 mm.

The laminate is preferably prepared as follows.

A colored layer is sandwiched between two layers of clear glass to obtain a laminate before pressure bonding. The obtained laminate before pressure bonding is put in a rubber bag, the rubber bag is degassed at a vacuum degree of 2.6 kPa for 20 minutes, then transferred into an oven in the degassed state, and held at 90° C. for 30 minutes for vacuum press to preliminarily pressure-bond the layers in the laminate before pressure bonding. After the preliminary pressure-bonding, the laminate before pressure bonding is subjected to pressure-bonding in an autoclave under the conditions of a temperature of 135° C. and a pressure of 1.2 MPa for 20 minutes to obtain a laminate.

The colored layer in preparation of the laminate can be obtained with, for example, the following method.
(1) A method of obtaining a colored layer through separating the layers in an interlayer film. A colored layer may be obtained with a method in which a laminated glass is cooled with liquid nitrogen or the like, then the lamination glass members and the interlayer film are separated, and the layers in the separated interlayer film are separated to obtain a colored layer. (2) A method of preparing a colored layer having the same thickness as a colored layer in an interlayer film (colored layer for measurement of the absorbance and the visible light transmittance) by using the same material (composition) as the material for the colored layer.

The laminate is prepared for measurement of the absorbance and the visible light transmittance.

From the viewpoint of suppressing coloring of the reflected light, the value of $A_{650}/A_{550}$ (ratio of the absorbance of the laminate at a wavelength of 650 nm to the absorbance of the laminate at a wavelength of 550 nm) is 0.6 or more and 1.4 or less. From the viewpoint of suppressing coloring of the reflected light further effectively, the value of $A_{650}/A_{550}$ (ratio of the absorbance of the laminate at a wavelength of 650 nm to the absorbance of the laminate at a wavelength of 550 nm) is preferably 0.7 or more and more preferably 0.8 or more, and preferably 1.3 or less and more preferably 1.2 or less.

From the viewpoint of suppressing coloring of the reflected light, the value of $A_{650}/A_{450}$ (ratio of the absorbance of the laminate at a wavelength of 650 nm to the absorbance of the laminate at a wavelength of 450 nm) is 0.6 or more and 1.4 or less. From the viewpoint of suppressing coloring of the reflected light further effectively, the value of $A_{650}/A_{450}$ (ratio of the absorbance of the laminate at a wavelength of 650 nm to the absorbance of the laminate at a wavelength of 450 nm) is preferably 0.7 or more and more preferably 0.8 or more, and preferably 1.3 or less and more preferably 1.2 or less.

From the viewpoint of suppressing coloring of the reflected light, the value of $A_{550}/A_{450}$ (ratio of the absorbance of the laminate at a wavelength of 550 nm to the absorbance of the laminate at a wavelength of 450 nm) is 0.6 or more and 1.4 or less. From the viewpoint of suppressing coloring of the reflected light further effectively, the value of $A_{550}/A_{450}$ (ratio of the absorbance of the laminate at a wavelength of 550 nm to the absorbance of the laminate at a wavelength of 450 nm) is preferably 0.7 or more and more preferably 0.8 or more, and preferably 1.3 or less and more preferably 1.2 or less.

From the viewpoint of suppressing coloring of the reflected light further effectively, $A_{650}$ (the absorbance of the laminate at a wavelength of 650 nm) is preferably 0.1 or more and more preferably 0.2 or more, and preferably 0.4 or less and more preferably 0.3 or less.

From the viewpoint of suppressing coloring of the reflected light further effectively, $A_{550}$ (the absorbance of the laminate at a wavelength of 550 nm) is preferably 0.1 or more and more preferably 0.2 or more, and preferably 0.4 or less and more preferably 0.3 or less.

From the viewpoint of suppressing coloring of the reflected light further effectively, $A_{450}$ (the absorbance of the laminate at a wavelength of 450 nm) is preferably 0.1 or more and more preferably 0.2 or more, and preferably 0.4 or less and more preferably 0.3 or less.

The absorbances of the laminate at a wavelength of 650 nm, 550 nm, and 450 nm can be measured using, for example, a spectrophotometer ("U-4100" manufactured by Hitachi High-Tech Corporation).

From the viewpoint of suppressing coloring of the reflected light, the visible light transmittance of the laminate is 82% or less. From the viewpoint of suppressing coloring of the reflected light further effectively, the visible light transmittance of the laminate is preferably 70% or less, more preferably 50% or less, still more preferably 20% or less, and particularly preferably 10% or less. From the viewpoint of enhancing the transparency of the laminated glass, the visible light transmittance of the laminate is preferably 1% or more, more preferably 17% or more, and still more preferably 75% or more.

The visible light transmittance of the laminate is measured using a spectrophotometer ("U-4100" manufactured by Hitachi High-Tech Corporation) at a wavelength of 380 nm to 780 nm in accordance with JIS R 3106: 1998.

With the laminated glass according to the present invention having the second configuration, an effect of the present invention can be exhibited. That is, the fact that the colored layer contains carbon black leads to effective suppression of coloring of the reflected light.

When the laminated glass according to the present invention has the first configuration, the infrared reflective layer may contain carbon black, or need not contain carbon black. When the laminated glass according to the present invention has the first configuration, the colored layer may contain carbon black, or need not contain carbon black. When the laminated glass according to the present invention has the first configuration, the colored layer preferably contains carbon black as the coloring agent.

The absorbance of the laminated glass at a wavelength of 650 nm is represented by $A_{650}'$, the absorbance of the laminated glass at a wavelength of 550 nm is represented by $A_{550}'$, and the absorbance of the laminated glass at a wavelength of 450 nm is represented by $A_{450}'$.

In 100% of the total plane area of the laminated glass, the plane area of the portion in which the value of $A_{650}'/A_{550}'$ (ratio of the absorbance of the laminated glass at a wavelength of 650 nm to the absorbance of the laminated glass at a wavelength of 550 nm) is 0.6 or more and 1.4 or less is preferably 30% or more and more preferably 50% or more. When the plane area is the above-described lower limit or more, it is possible to suppress coloring of the reflected light further effectively.

In 100% of the total plane area of the laminated glass, the plane area of the portion in which the value of $A_{650}'/A_{450}'$ (ratio of the absorbance of the laminated glass at a wavelength of 650 nm to the absorbance of the laminated glass at a wavelength of 450 nm) is 0.6 or more and 1.4 or less is preferably 30% or more and more preferably 50% or more. When the plane area is the above-described lower limit or more, it is possible to suppress coloring of the reflected light further effectively.

In 100% of the total plane area of the laminated glass, the plane area of the portion in which the value of $A_{550}'/A_{450}'$ (ratio of the absorbance of the laminated glass at a wavelength of 550 nm to the absorbance of the laminated glass at a wavelength of 450 nm) is 0.6 or more and 1.4 or less is preferably 30% or more and more preferably 50% or more. When the plane area is the above-described lower limit or more, it is possible to suppress coloring of the reflected light further effectively.

The laminated glass generally has a longitudinal axis, a transverse axis, and a height axis.

The value of $A_{650}'/A_{550}'$ at the center along the longitudinal axis and at the center along the transverse axis of the laminated glass is preferably 0.6 or more, more preferably 0.7 or more, and still more preferably 0.8 or more, and preferably 1.4 or less, more preferably 1.3 or less, and still more preferably 1.2 or less. The value of $A_{650}'/A_{550}'$ is the ratio of the absorbance of the laminated glass at a wavelength of 650 nm to the absorbance of the laminated glass at a wavelength of 550 nm. When the value of $A_{650}'/A_{550}'$ is the above-described lower limit or more and the above-described upper limit or less, it is possible to suppress coloring of the reflected light further effectively.

The value of $A_{650}'/A_{450}'$ at the center along the longitudinal axis and at the center along the transverse axis of the laminated glass is preferably 0.6 or more, more preferably 0.7 or more, and still more preferably 0.8 or more, and preferably 1.4 or less, more preferably 1.3 or less, and still more preferably 1.2 or less. The value of $A_{650}'/A_{450}'$ is the ratio of the absorbance of the laminated glass at a wavelength of 650 nm to the absorbance of the laminated glass at a wavelength of 450 nm. When the value of $A_{650}'/A_{450}'$ is the above-described lower limit or more and the above-described upper limit or less, it is possible to suppress coloring of the reflected light further effectively.

The value of $A_{550}'/A_{450}'$ at the center along the longitudinal axis and at the center along the transverse axis of the laminated glass is preferably 0.6 or more, more preferably 0.7 or more, and still more preferably 0.8 or more, and preferably 1.4 or less, more preferably 1.3 or less, and still more preferably 1.2 or less. The value of $A_{550}'/A_{450}'$ is the ratio of the absorbance of the laminated glass at a wavelength of 550 nm to the absorbance of the laminated glass at a wavelength of 450 nm. When the value of $A_{550}'/A_{450}'$ is the above-described lower limit or more and the above-described upper limit or less, it is possible to suppress coloring of the reflected light further effectively.

The absorbance of the laminated glass at a wavelength of 650 nm, 550 nm, and 450 nm can be measured using, for example, a spectrophotometer ("U-4100" manufactured by Hitachi High-Tech Corporation).

Hereinafter, specific embodiments of the present invention will be described with reference to the drawings.

FIG. 1 is a sectional view schematically showing a laminated glass for vehicle according to a first embodiment of the present invention.

A laminated glass for vehicle 11 shown in FIG. 1 has a first lamination glass member 1, a second lamination glass member 2, and an interlayer film 3. The first lamination glass member 1 is a lamination glass member to be arranged at the exterior side of a vehicle. The second laminated glass 2 is a lamination glass member to be arranged at the interior side of a vehicle. The interlayer film 3 is an interlayer film for laminated glass. The first lamination glass member 1 is layered on a first surface 3a of the interlayer film 3. The second lamination glass member 2 is layered on a second surface 3b opposite to the first surface 3a of the interlayer film 3. The interlayer film 3 has an infrared reflective layer 31, a colored layer 32, and a resin layer 33. The interlayer film 3 has a three-layer structure. In the interlayer film 3, the infrared reflective layer 31 is arranged closer to the second laminated glass 2 than the colored layer 32 is. In the interlayer film 3, the colored layer 32 is arranged closer to the first lamination glass member 1 than the infrared reflective layer 31 is. In the interlayer film 3, the resin layer 33 is arranged closer to the second lamination glass member 2 than the infrared reflective layer 31 is.

The colored layer 32b is arranged on a first surface 31a side of the infrared reflective layer 31 to be layered thereon. The resin layer 33 is arranged on a second surface 31b side opposite to the first surface 31a of the infrared reflective layer 31 to be layered thereon. In the interlayer film 3, the infrared reflective layer 31 is an intermediate layer. In the interlayer film 3, each of the colored layer 32 and the resin layer 33 is a protective layer and is a surface layer in the present embodiment. The infrared reflective layer 31 is arranged between the resin layer 33 and the colored layer 32 to be sandwiched therebetween. Therefore, the interlayer film 3 has a multilayer structure in which the colored layer 32, the infrared reflective layer 31, and the resin layer 33 are layered in this order (the colored layer 32/the infrared reflective layer 31/the resin layer 33).

The interlayer film 3 is arranged between the first lamination glass member 1 and the second lamination glass member 2 to be sandwiched therebetween.

The first lamination glass member 1 is arranged on an outer surface 32a of the colored layer 32 to be layered thereon. The second lamination glass member 2 is arranged on an outer surface 33a of the resin layer 33 to be layered thereon.

The laminated glass for vehicle 11 has a structure of (the exterior side of a vehicle) the first lamination glass member 1/the colored layer 32/the infrared reflective layer 31/the resin layer 33/the second lamination glass member 2 (the interior side of a vehicle).

FIG. 2 is a sectional view schematically showing a laminated glass for vehicle according to a second embodiment of the present invention.

A laminated glass for vehicle 11A shown in FIG. 2 has a first lamination glass member 1, a second lamination glass member 2, and an interlayer film 3A. The first lamination glass member 1 is a lamination glass member to be arranged at the exterior side of a vehicle. The second laminated glass 2 is a lamination glass member to be arranged at the interior side of a vehicle. The interlayer film 3A is an interlayer film for laminated glass. The first lamination glass member 1 is layered on a first surface 3Aa of the interlayer film 3A. The second lamination glass member 2 is layered on a second surface 3Ab opposite to the first surface 3Aa of the interlayer film 3A. The interlayer film 3A has an infrared reflective layer 31 and a colored layer 32. The interlayer film 3A has a two-layer structure. In the interlayer film 3A, the infrared reflective layer 31 is arranged closer to the second laminated glass 2 than the colored layer 32 is. In the interlayer film 3A, the colored layer 32 is arranged closer to the first lamination glass member 1 than the infrared reflective layer 31 is.

The colored layer 32 is arranged on a first surface 31a side of the infrared reflective layer 31 to be layered thereon. The interlayer film 3A has a multilayer structure in which the colored layer 32 and the infrared reflective layer 31 are layered in this order (the colored layer 32/the infrared reflective layer 31).

The interlayer film 3A is arranged between the first lamination glass member 1 and the second lamination glass member 2 to be sandwiched therebetween.

The first lamination glass member 1 is arranged on an outer surface 32a of the colored layer 32 to be layered thereon. The second lamination glass member 2 is arranged on a second surface (outer surface) 31b of the infrared reflective layer 31 to be layered thereon.

The laminated glass for vehicle 11A has a structure of (the exterior side of a vehicle) the first lamination glass member 1/the colored layer 32/the infrared reflective layer 31/the second lamination glass member 2 (the interior side of a vehicle).

Another layer may be arranged between the colored layer 32 and the infrared reflective layer 31, and between the infrared reflective layer 31 and the resin layer 33. The colored layer 32 and the infrared reflective layer 31 are preferably layered directly, and so are the infrared reflective layer 31 and the resin layer 33. Examples of other layers include adhesive layers and layers containing polyethylene terephthalate and the like.

Hereinafter, other details of each member included in the laminated glass for vehicle according to the present invention will be described.

(Interlayer Film)
<Infrared Reflective Layer>

The infrared reflective layer reflects an infrared ray. The infrared reflective layer is not particularly limited as long as it has an infrared ray reflecting performance.

Examples of the infrared reflective layer include resin films with a metal foil, multilayer laminated films in which a metal layer and a dielectric layer are formed on a resin layer, multilayer resin films, and liquid crystal films. These films have an infrared ray reflecting performance.

The infrared reflective layer is particularly preferably a resin film with a metal foil, a multilayer resin film, or a liquid crystal film. These films have quite an excellent infrared ray reflecting performance. Therefore, these films are used to obtain a laminated glass having a further high heat shielding property and being capable of maintaining a high visible light transmittance for a further long period of time.

The resin film with a metal foil includes a resin film and a metal foil with which the outer surface of the resin film is laminated. Examples of the material for the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material for the metal foil include aluminum, copper, silver, gold, palladium, and alloys containing such a metal.

The multilayer laminated film in which a metal layer and a dielectric layer are formed on a resin layer is a multilayer laminated film in which a metal layer and a dielectric layer are alternately layered in an arbitrary number of layers on a resin layer (resin film). In the multilayer laminated film in which a metal layer and a dielectric layer are formed on a resin layer, all the metal layers and the dielectric layers are preferably alternately layered. However, the multilayer laminated film may have a structural part in which some metal layers and dielectric layers are not alternately layered, such as a structural part of a metal layer/a dielectric layer/a metal layer/a dielectric layer/a metal layer/a metal layer/a dielectric layer/a metal layer.

Examples of the material for the resin layer (resin film) in the multilayer laminated film include the same materials as the materials for the resin film in the resin film with a metal foil. Examples of the material for the resin layer (resin film) in the multilayer laminated film include polyethylene, polypropylene, polylactic acid, poly(4-methylpentene-1), polyvinylidene fluoride, cyclic polyolefin, polymethylmethacrylate, polyvinyl chloride, polyvinyl alcohol, polyamides such as nylon 6, nylon 11, nylon 12, and nylon 66, polystyrene, polycarbonate, polyethylene terephthalate, polyethylene naphthalate, polyesters, polyphenylene sulfide, and polyetherimide. Examples of the material for the metal layer in the multilayer laminated film include the same materials as the materials for the metal foil in the resin film with a metal foil. A coating layer of a metal or a mixed oxide of a metal can be applied to both sides or one side of the metal layer. Examples of the material for the coating layer include $ZnO$, $Al_2O_3$, $Ga_2O_3$, $InO_3$, $MgO$, $Ti$, $NiCr$, and $Cu$.

Examples of the material for the dielectric layer in the multilayer laminated film include indium oxide.

The multilayer resin film is a laminated film in which a plurality of resin films are layered. Examples of the material for the multilayer resin film include the same materials as the materials for the resin layer (resin film) in the multilayer laminated film. The number of layered resin films in the multilayer resin film is 2 or more, and may be 3 or more, or 5 or more. The number of layered resin films in the multilayer resin film may be 1,000 or less, 100 or less, or 50 or less.

The multilayer resin film may be a multilayer resin film in which two or more thermoplastic resin layers having different optical properties (refractive indexes) are alternately or randomly layered in an arbitrary number of layers. Such a multilayer resin film is configured so as to obtain a desired infrared ray reflecting performance.

Examples of the liquid crystal film include films in which cholesteric liquid crystal layers that reflect light having an arbitrary wavelength are layered in an arbitrary number of layers. Such a liquid crystal film is configured so as to obtain a desired infrared ray reflecting performance.

From the viewpoint of satisfactorily exhibiting an effect of the present invention, the infrared reflective layer preferably contains carbon black.

When the infrared reflective layer is the resin film with a metal foil, the resin film in the resin film with a metal foil preferably contains the carbon black.

When the infrared reflective layer is the multilayer laminated film in which a metal layer and a dielectric layer are formed on a resin layer, the resin layer (resin film) in the multilayer laminated film preferably contains the carbon black.

When the infrared reflective layer is the multilayer resin film, the resin layer (resin film) in the multilayer laminated film preferably contains the carbon black.

<Colored Layer and Resin Layer>

The colored layer and the resin layer different from both the infrared reflective layer and the colored layer (exemplified by the resin layer when the laminated glass for vehicle has a structure of (the exterior side of a vehicle) the first lamination glass member/the colored layer/the infrared reflective layer/the resin layer/the second lamination glass member (the interior side of a vehicle) will be described.
Thermoplastic Resin:

The colored layer preferably contains a thermoplastic resin (hereinafter, sometimes described as a thermoplastic resin (1)). The colored layer preferably contains a polyvinyl acetal resin (hereinafter, sometimes described as a polyvinyl acetal resin (1)) as the thermoplastic resin (1). The resin layer preferably contains a thermoplastic resin (hereinafter, sometimes described as a thermoplastic resin (2)). The resin layer preferably contains a polyvinyl acetal resin (hereinafter, sometimes described as a polyvinyl acetal resin (2)) as the thermoplastic resin (2).

The thermoplastic resin (1) and the thermoplastic resin (2) may be the same as or different from each other. One kind of each of the thermoplastic resin (1) and the thermoplastic resin (2) may be used alone, and two or more kinds thereof may be used in combination. One kind of each of the polyvinyl acetal resin (1) and the polyvinyl acetal resin (2) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl acetate resin, a polystyrene resin, and an ionomer resin. A thermoplastic resin other than these thermoplastic resins may be used.

The thermoplastic resin is preferably a polyvinyl acetal resin. By using the polyvinyl acetal resin in combination with a plasticizer, the colored layer and the resin layer have further high adhesive force to the lamination glass member and another layer such as the infrared reflective layer.

The polyvinyl acetal resin can be produced, for example, through acetalization of polyvinyl alcohol (PVA) with an aldehyde. The polyvinyl acetal resin is preferably an acetalized product of polyvinyl alcohol. The polyvinyl alcohol can be obtained, for example, through saponification of polyvinyl acetate. The polyvinyl alcohol generally has a saponification degree in the range of 70 mol % to 99.9 mol %.

The polyvinyl alcohol (PVA) preferably has an average polymerization degree of 200 or more, more preferably 500 or more, still more preferably 1,500 or more, still even more preferably 1,600 or more, particularly preferably 2,600 or more, and most preferably 2,700 or more, and preferably 5,000 or less, more preferably 4,000 or less, and still more preferably 3,500 or less. When the average polymerization degree is the above-described lower limit or more, the laminated glass has further high penetration resistance. When the average polymerization degree is the above-described upper limit or less, the colored layer and the resin layer are further easily molded.

The average polymerization degree of polyvinyl alcohol is determined with a method in accordance with JIS K 6726 "Testing methods for polyvinyl alcohol".

The number of carbon atoms in the acetal group included in the polyvinyl acetal resin is not particularly limited. The aldehyde used in production of the polyvinyl acetal resin is not particularly limited. The acetal group in the polyvinyl acetal resin preferably has 3 to 5 carbon atoms, and more preferably 3 or 4 carbon atoms. When the number of carbon atoms in the acetal group in the polyvinyl acetal resin is 3 or more, the colored layer and the resin layer have a sufficiently low glass transition temperature.

The aldehyde is not particularly limited. In general, an aldehyde having 1 to 10 carbon atoms is suitably used. Examples of the aldehyde having 1 to 10 carbon atoms include formaldehyde, acetaldehyde, propionaldehyde, n-butyraldehyde, isobutylaldehyde, n-valeraldehyde, 2-ethylbutyraldehyde, n-hexylaldehyde, n-octylaldehyde, n-nonylaldehyde, n-decylaldehyde, and benzaldehyde. Propionaldehyde, n-butyraldehyde, isobutylaldehyde, n-hexylaldehyde, and n-valeraldehyde are preferable, propionaldehyde, n-butyraldehyde, and isobutylaldehyde are more preferable, and n-butyraldehyde is still more preferable. One kind of the aldehyde may be used alone, and two or more kinds thereof may be used in combination.

The polyvinyl acetal resin preferably has a hydroxyl group content (hydroxyl group amount) of 15 mol % or more, more preferably 18 mol % or more, still more preferably 20 mole or more, and particularly preferably 28 mol % or more, and preferably 40 mol % or less, more preferably 35 mol % or less, and still more preferably 32 mol % or less. When the hydroxyl group content is the above-described lower limit or more, the adhesive force between the colored layer and the resin layer is further high. When the hydroxyl group content is the above-described upper limit or less, the colored layer and the resin layer have high flexibility, and as a result, are easily handled.

The hydroxyl group content of the polyvinyl acetal resin is a mole fraction, represented in percentage, obtained by dividing the amount of ethylene groups to which the hydroxyl group is bonded by the total amount of ethylene groups in the main chain. The amount of the ethylene group to which the hydroxyl group is bonded can be determined, for example, in accordance with JIS K 6728 "Testing methods for polyvinyl butyral".

The polyvinyl acetal resin preferably has an acetylation degree (acetyl group amount) of 0.1 mol % or more, more preferably 0.3 mol or more, and still more preferably 0.5 mol % or more, and preferably 30 mol % or less, more preferably 25 mol % or less, still more preferably 20 mol- or less, particularly preferably 15 mole or less, and most preferably 3 mol, or less. When the acetylation degree is the above-described lower limit or more, the polyvinyl acetal resin has high compatibility with a plasticizer. When the acetylation degree is the above-described upper limit or less, the laminated glass has high moisture resistance.

The acetylation degree is a mole fraction, represented in percentage, obtained by dividing the amount of ethylene groups to which the acetyl group is bonded by the total amount of ethylene groups in the main chain. The amount of the ethylene group to which the acetyl group is bonded can be determined, for example, in accordance with JIS K 6728 "Testing methods for polyvinyl butyral".

The polyvinyl acetal resin preferably has an acetalization degree (when the polyvinyl acetal resin is a polyvinyl butyral resin, a butyralization degree) of 60 mol % or more and more preferably 63 mol % or more, and preferably 85 mol % or less, more preferably 75 mol % or less, and still more preferably 70 mol % or less. When the acetalization degree is the above-described lower limit or more, the polyvinyl acetal resin has high compatibility with a plasticizer. When the acetalization degree is the above-described upper limit or less, production of the polyvinyl acetal resin needs short reaction time.

The acetalization degree is determined as follows. First, the amount of the ethylene group to which the hydroxyl group is bonded and the amount of the ethylene group to which the acetyl group is bonded are subtracted from the total ethylene group amount in the main chain to obtain a remainder value. The obtained value is divided by the total ethylene group amount in the main chain to obtain a molar fraction. The mole fraction represented in percentage is the acetalization degree.

The hydroxyl group content (hydroxyl group amount), the acetalization degree (butyralization degree), and the acetylation degree are preferably calculated from the results determined by a method in accordance with JIS K 6728 "Testing methods for polyvinyl butyral". In this context, a method in accordance with ASTM D1396-92 may be used. When the polyvinyl acetal resin is a polyvinyl butyral resin, the hydroxyl group content (hydroxyl group amount), the acetalization degree (butyralization degree), and the acetylation degree can be calculated from the results determined by a method in accordance with JIS K 6728 "Testing methods for polyvinyl butyral".

The content of the polyvinyl acetal resin in 100% by weight of the thermoplastic resin contained in the interlayer film is preferably 10% by weight or more, more preferably 30; by weight or more, still more preferably 50; by weight or more, still even more preferably 70; by weight or more, particularly preferably 80% by weight or more, and most preferably 90% by weight or more. The main component (50% by weight or more) of the thermoplastic resin in the interlayer film is preferably the polyvinyl acetal resin.

Plasticizer:

From the viewpoint of further enhancing the adhesive force of the colored layer, the colored layer preferably contains a plasticizer. From the viewpoint of further enhancing the adhesive force of the resin layer, the resin layer preferably contains a plasticizer. When the colored layer and the resin layer contain, as the thermoplastic resin, the polyvinyl acetal resin, the colored layer and the resin layer particularly preferably contain a plasticizer. The layer containing the polyvinyl acetal resin preferably contains a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as the monobasic organic acid esters and polybasic organic acid esters, and organic phosphoric acid plasticizers such as organic phosphate plasticizers and organic phosphite plasticizers. The plasticizer is preferably an organic ester plasticizer. The plasticizer is preferably a liquid plasticizer.

Examples of the monobasic organic acid ester include glycol esters obtained through a reaction between a glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octyl acid, 2-ethylhexyl acid, n-nonylic acid, and decylic acid.

Examples of the polybasic organic acid ester include ester compounds of a polybasic organic acid and an alcohol having a linear or branched structure including 4 to 8 carbon atoms. Examples of the polybasic organic acid include adipic acid, sebacic acid, and azelaic acid.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, mixtures of heptyl adipate and nonyl adipate, diisononyl adipate, diisodecyl adipate, heptyl nonyl adipate, dibutyl sebacate, oil-modified alkyd sebacates, and mixtures of a phosphoric ester and an adipic acid ester. Other organic ester plasticizers may be used. Adipic esters other than the above-described adipic esters may be used.

Examples of the organic phosphoric acid plasticizer include tributoxyethyl phosphate, isodecylphenyl phosphate, and triisopropyl phosphate.

The plasticizer is preferably a diester plasticizer represented by Formula (1) described below.

[Chemical 1]

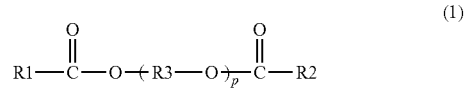

In Formula (1) described above, R1 and R2 each represent an organic group having 5 to 10 carbon atoms, R3 represents an ethylene group, an isopropylene group, or an n-propylene group, and p represents an integer of 3 to 10. R1 and R2 in Formula (1) above are each preferably an organic group having 6 to 10 carbon atoms.

The plasticizer preferably contains triethylene glycol di-2-ethylhexanoate (3GO) or triethylene glycol di-2-ethylbutyrate (3GH), and more preferably contains triethylene glycol di-2-ethylhexanoate.

The content of the plasticizer is not particularly limited. In the layer containing the plasticizer (colored layer or resin layer), the content of the plasticizer is preferably 25 parts by weight or more, more preferably 30 parts by weight or more, and still more preferably 35 parts by weight or more based on 100 parts by weight of the thermoplastic resin. In the layer containing the plasticizer (colored layer or resin layer), the content of the plasticizer is preferably 75 parts by weight or less, more preferably 60 parts by weight or less, still more preferably 50 parts by weight or less, and particularly preferably 40 parts by weight or less based on 100 parts by weight of the thermoplastic resin. When the content of the plasticizer is the above-described lower limit or more, the laminated glass has further high penetration resistance. When the content of the plasticizer is the above-described upper limit or less, the laminated glass has further high transparency.

Coloring Agent:

The colored layer contains a coloring agent. The resin layer may contain a coloring agent, or need not contain coloring agent. The content of the coloring agent in the resin layer may be smaller than the content of the coloring agent in the colored layer. One kind of the coloring agent may be used alone and two or more kinds thereof may be used in combination.

Examples of the coloring agent include pigments and dyes.

The pigment and the dye are discriminated from each other in the following manner.

A polyvinyl butyral resin (polymerization degree of polyvinyl alcohol: 1700, hydroxyl group content: 30 mol %, acetylation degree: 1 mole, butyralization degree: 69 mol %) is prepared. With 100 parts by weight of the polyvinyl butyral resin and 40 parts by weight of triethylene glycol di-2-ethylhexanoate (3GO), a coloring agent is kneaded in an amount such that the coloring agent is 0.015% by weight of 100% by weight of the resin film to be obtained (100% by weight of the total amount of the polyvinyl butyral resin, the 3GO, and the coloring agent) to obtain a kneaded product. The kneaded product is extruded to obtain a resin film having a thickness of 760 μm. The resin film is arranged between two layers of clear glass (thickness: 2.5 mm) having a visible light transmittance, measured in accordance with JIS R 3106: 1998, of 90% to prepare a laminated glass. The coloring agent that gives a laminated glass having a haze value of 0.35% or more is defined as a pigment. The coloring agent that gives a haze value of less than 0.35% is defined as a dye.

The pigment may be an organic pigment or an inorganic pigment. The organic pigment may be an organic pigment having a metal atom, and may be an organic pigment not having a metal atom. One kind of the pigment may be used alone, and two or more kinds thereof may be used in combination.

Examples of the organic pigment include phthalocyanine compounds, quinacridone compounds, azo compounds, pentaphene compounds, dioxazine compounds, perylene compounds, indole compounds, and dioxazine compounds.

Examples of the inorganic pigment include carbon black, titanium black, aniline black, graphene, iron oxide, zinc oxide, tungsten oxide, and titanium oxide.

From the viewpoint of suppressing coloring of the reflected light further effectively and satisfying the first configuration further easily, the coloring agent contained in the colored layer preferably contains carbon black, and is more preferably carbon black.

The carbon black preferably has an average particle size of 0.1 μm or more and more preferably 0.2 μm or more, and preferably 100 μm or less and more preferably 10 μm or less. When the average particle size is the above-described lower limit or more and the above-described upper limit or less, it is possible to further suppress coloring of the reflected light and to easily satisfy the first configuration.

The average particle size refers to a weight average particle size. The average particle size can be measured by a dynamic light scattering method using a light scattering measuring device with an Ar laser as a light source. Examples of the light scattering measuring device include "DLS-6000AL" manufactured by Otsuka Electronics Co., Ltd.

When the resin layer contains the coloring agent, the coloring agent contained in the resin layer is preferably a phthalocyanine compound, a naphthalocyanine compound, an anthracyanine compound, a quinacridone compound, an azo compound, a pentaphene compound, a dioxazine compound, a perylene compound, an indole compound, or carbon black.

From the viewpoint of enhancing the design effectively and suppressing discoloration due to light and heat effectively, the coloring agent contained in the resin layer is preferably at least one Ingredient X of a phthalocyanine compound, a naphthalocyanine compound, or an anthracyanine compound. The Ingredient X also corresponds to the heat shielding substance described below.

The Ingredient X is not particularly limited. As the Ingredient X, conventionally known phthalocyanine compounds, naphthalocyanine compounds, and anthracyanine compounds can be used.

Examples of the Ingredient X include phthalocyanine, phthalocyanine derivatives, naphthalocyanine, naphthalocyanine derivatives, anthracyanine, and anthracyanine derivatives. The phthalocyanine compounds and the phthalocyanine derivatives each preferably have a phthalocyanine skeleton. The naphthalocyanine compounds and the naphthalocyanine derivatives each preferably have a naphthalocyanine skeleton. The anthracyanine compounds and the anthracyanine derivatives each preferably have an anthracyanine skeleton.

From the viewpoint of further enhancing the heat shielding property, the Ingredient X is preferably phthalocyanine, a phthalocyanine derivative, naphthalocyanine, or a naphthalocyanine derivative, and more preferably phthalocyanine or a phthalocyanine derivative.

From the viewpoint of enhancing the heat shielding property effectively and maintaining the visible light transmittance at a further high level for a long period of time, the Ingredient X preferably contains a vanadium atom or a copper atom. The Ingredient X preferably contains a vanadium atom, or preferably contains a copper atom. The Ingredient X is more preferably at least one of phthalocyanine including a vanadium atom or a copper atom, or a phthalocyanine derivative including a vanadium atom or a copper atom. From the viewpoint of further suppress occurrence of a ghost image in the laminated glass and further enhancing the heat shielding property, the Ingredient X preferably has a structural unit in which an oxygen atom is bonded to a vanadium atom.

The content of the coloring agent in 100% by weight of the colored layer is preferably 0.001% by weight or more, more preferably 0.002% by weight or more, still more preferably 0.003% by weight or more, particularly preferably 0.004% by weight or more, and most preferably 0.005% by weight or more. The content of the coloring agent in 100% by weight of the colored layer is preferably 0.05% by weight or less, more preferably 0.04% by weight or less, still more preferably 0.03% by weight or less, particularly preferably 0.02% by weight or less, and most preferably 0.01% by weight or less. When the content of the coloring agent is the above-described lower limit or more and the above-described upper limit or less, it is possible to further suppress coloring of the reflected light and to easily satisfy the first configuration.

The content of the carbon black in 100% by weight of the colored layer is preferably 0.001% by weight or more, more preferably 0.002% by weight or more, still more preferably 0.003% by weight or more, particularly preferably 0.004% by weight or more, and most preferably 0.005% by weight or more. The content of the carbon black in 100% by weight of the colored layer is preferably 0.18% by weight or less, more preferably 0.16% by weight or less, still more preferably 0.14% by weight or less, particularly preferably 0.12% by weight or less, and most preferably 0.1% by weight or less. When the content of the carbon black is the above-described lower limit or more and the above-described upper limit or less, it is possible to further suppress coloring of the reflected light and to easily satisfy the first configuration.

When the resin layer contains the coloring agent, the content of the coloring agent in 100% by weight of the resin layer is preferably 0.001% by weight or more, more preferably 0.002% by weight or more, still more preferably 0.003% by weight or more, particularly preferably 0.004% by weight or more, and most preferably 0.005% by weight or more. When the resin layer contains the coloring agent, the content of the coloring agent in 100% by weight of the resin layer is preferably 10% by weight or less, more preferably 9% by weight or less, still preferably 8% by weight or less, and particularly preferably 7% by weight or less. When the content of the coloring agent is the above lower limit or more, the design qualities are further enhanced. When the content of the coloring agent is the above upper limit or less, the visibility through the laminated glass is further enhanced.

Heat Shielding Substance:

The colored layer may contain a heat shielding substance, or need not contain heat shielding substance. The resin layer may contain a heat shielding substance, or need not contain heat shielding substance. The content of the heat shielding substance in the colored layer may be smaller than the content of the heat shielding substance in the resin layer. The resin layer preferably contains a heat shielding substance. One kind of the heat shielding substance may be used alone, and two or more kinds thereof may be used in combination.

The heat shielding substance preferably contains at least one Ingredient X of a phthalocyanine compound, a naphthalocyanine compound, or an anthracyanine compound, or contains heat shielding particles. In this case, the heat shielding substance may contain both the Ingredient X and the heat shielding particles. The Ingredient X also corresponds to the coloring agent.

The Ingredient X is not particularly limited. As the Ingredient X, conventionally known phthalocyanine compounds, naphthalocyanine compounds, and anthracyanine compounds can be used. One kind of the Ingredient X may be used alone, and two or more kinds thereof may be used in combination.

Examples of the Ingredient X include phthalocyanine, phthalocyanine derivatives, naphthalocyanine, naphthalocyanine derivatives, anthracyanine, and anthracyanine derivatives. The phthalocyanine compounds and the phthalocyanine derivatives each preferably have a phthalocyanine skeleton. The naphthalocyanine compounds and the naphthalocyanine derivatives each preferably have a naphthalocyanine skeleton. The anthracyanine compounds and the anthracyanine derivatives each preferably have an anthracyanine skeleton.

From the viewpoint of further enhancing the heat shielding property of the laminated glass, the Ingredient X is preferably phthalocyanine, a phthalocyanine derivative, naphthalocyanine, or a naphthalocyanine derivative, and more preferably phthalocyanine or a phthalocyanine derivative.

From the viewpoint of enhancing the heat shielding property effectively and maintaining the visible light transmittance at a further high level for a long period of time, the Ingredient X preferably contains a vanadium atom or a copper atom. The Ingredient X preferably contains a vanadium atom, or preferably contains a copper atom. The Ingredient X is more preferably at least one of phthalocyanine including a vanadium atom or a copper atom, or a phthalocyanine derivative including a vanadium atom or a copper atom. From the viewpoint of further enhancing the heat shielding property of the laminated glass, the Ingredient X preferably has a structural unit in which an oxygen atom is bonded to a vanadium atom.

The content of the Ingredient X in 100% by weight of the layer containing the Ingredient X (colored layer or resin layer) is preferably 0.001% by weight or more, more preferably 0.005% by weight or more, still more preferably 0.01% by weight or more, and particularly preferably 0.02% by weight or more. The content of the Ingredient X in 100% by weight of the layer containing the Ingredient X (colored layer or resin layer) is preferably 0.2% by weight or less, more preferably 0.1% by weight or less, still more preferably 0.05% by weight or less, and particularly preferably 0.04% by weight or less. When the content of the Ingredient X is the above-described lower limit or more and the above-described upper limit or less, the heat shielding property is sufficiently high, and the visible light transmittance is sufficiently high. For example, the visible light transmittance can be made 70% or more.

The colored layer may contain heat shielding particles, or need not contain heat shielding particles. The resin layer may contain heat shielding particles, or need not contain heat shielding particles. The content of the heat shielding particles in the colored layer may be smaller than the content of the heat shielding particles in the resin layer. The resin layer preferably contains the heat shielding particles. The heat shielding particle is of a heat shielding substance. By using the heat shielding particles, an infrared ray (heat ray) can be effectively blocked. One kind of the heat shielding particles may be used alone, and two or more kinds thereof may be used in combination.

From the viewpoint of further enhancing the heat shielding property of the laminated glass, the heat shielding particles are more preferably metal oxide particles. The heat shielding particle is preferably a particle formed of a metal oxide (metal oxide particle).

Infrared rays having a wavelength, longer than that of visible light, of 780 nm or more have a smaller amount of energy than ultraviolet rays. However, infrared rays have a large thermal effect, and when an infrared ray is absorbed by a substance, the substance emits heat. For this reason, infrared rays are generally called heat rays. By using the heat shielding particles, infrared rays (heat rays) can be effectively blocked. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles (CWO particles), thallium-doped tungsten oxide particles, rubidium-doped tungsten oxide particles, tin-doped indium oxide particles (ITO particles), tin-doped zinc oxide particles, and silicon-doped zinc oxide particles, and a lanthanum hexaboride ($LaB_6$) particle. Heat shielding particles other than these particles may be used. Because of the high heat ray shielding function, metal oxide particles are preferable, ATO particles, GZO particles, IZO particles, ITO particles, and tungsten oxide particles are more preferable, and ITO particles and tungsten oxide particles are particularly preferable. In particular, because of the high heat ray shielding function and ease of obtaining, tin-doped indium oxide particles (ITO particles) are preferable, and tungsten oxide particles are also preferable.

From the viewpoint of further enhancing the heat shielding property of the laminated glass, the tungsten oxide particles are preferably metal-doped tungsten oxide particles. Examples of the "tungsten oxide particles" include metal-doped tungsten oxide particles. Specific examples of the metal-doped tungsten oxide particles include sodium-doped tungsten oxide particles, cesium-doped tungsten oxide particles, thallium-doped tungsten oxide particles, and rubidium-doped tungsten oxide particles.

From the viewpoint of further enhancing the heat shielding property of the laminated glass, cesium-doped tungsten oxide particles are particularly preferable. From the viewpoint of further enhancing the heat shielding property of the laminated glass, the cesium-doped tungsten oxide particles are preferably tungsten oxide particles represented by the formula: $Cs_{0.33}WO_3$.

The heat shielding particles preferably have an average particle size of 0.01 µm or more and more preferably 0.02 µm or more, and preferably 0.1 µm or less and more preferably 0.05 µm or less. When the average particle size is the above-described lower limit or more, the heat ray shielding property is sufficiently high. When the average particle size is the above-described upper limit or less, the dispersibility of the heat shielding particles is high.

The term "average particle size" refers to a volume average particle size. The average particle size can be measured using a particle size distribution measuring device ("UPA-EX150" manufactured by NIKKISO CO., LTD.) or the like.

The content of the heat shielding particles in 100% by weight of the layer containing the heat shielding particles (colored layer or resin layer) is preferably 0.01% by weight or more, more preferably 0.1% by weight or more, still more preferably 1% by weight or more, and particularly preferably 1.5% by weight or more. The content of the heat shielding particles in 100% by weight of the layer containing the heat shielding particles (colored layer or resin layer) is preferably 6% by weight or less, more preferably 5.5% by weight or less, still more preferably 4% by weight or less, particularly preferably 3.5% by weight or less, and most preferably 3% by weight or less. When the content of the heat shielding particles is the above-described lower limit or more and the above-described upper limit or less, the heat shielding property is sufficiently high, and the visible light transmittance is sufficiently high.

Metal Salt:

The colored layer preferably contains at least one metal salt (hereinafter, sometimes described as metal salt M) of an alkali metal salt or an alkaline earth metal salt. The resin layer preferably contains the metal salt M. The alkali earth metal means six metals of Be, Mg, Ca, Sr, Ba, and Ra. By using the metal salt M, the adhesivity is easily controlled between the colored layer or resin layer and the infrared reflective layer, and between the colored layer or resin layer and the lamination glass member. One kind of the metal salt M may be used alone, and two or more kinds thereof may be used in combination.

The metal salt M preferably contains at least one metal selected from the group consisting of Li, Na, K, Rb, Cs, Mg, Ca, Sr, and Ba. The metal salt contained in the colored layer preferably contains K or Mg. The metal salt contained in the resin layer preferably contains K or Mg.

As the metal salt M, an alkali metal salt of an organic acid having 2 to 16 carbon atoms and an alkaline earth metal salt of an organic acid having 2 to 16 carbon atoms can be used. The metal salt M is more preferably a magnesium salt of an organic acid having 2 to 16 carbon atoms, and still more preferably a magnesium carboxylate having 2 to 16 carbon atoms or a potassium carboxylate having 2 to 16 carbon atoms.

Examples of the magnesium carboxylate having 2 to 16 carbon atoms and the potassium carboxylate having 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, and potassium 2-ethylhexanoate.

The total content of Mg and K in the layer containing the metal salt M (colored layer or resin layer) is preferably 5 ppm or more, more preferably 10 ppm or more, and still more preferably 20 ppm or more, and preferably 300 ppm or less, more preferably 250 ppm or less, and still more preferably 200 ppm or less. When the total content of Mg and K is the above-described lower limit or more and the above-described upper limit or less, the adhesivity can be further satisfactorily controlled between the colored layer or resin layer and the infrared reflective layer, and between the colored layer or resin layer and the lamination glass member.

Ultraviolet Ray Screening Agent:

The colored layer preferably contains an ultraviolet ray screening agent. The resin layer preferably contains an ultraviolet ray screening agent. Even if the laminated glass is used for a long period of time, the visible light transmittance is further less likely to decrease by using an ultraviolet ray screening agent. One kind of the ultraviolet ray screening agent may be used alone, and two or more kinds thereof may be used in combination.

Examples of the ultraviolet ray screening agent include ultraviolet ray absorbers. The ultraviolet ray screening agent is preferably an ultraviolet absorbing agent.

Examples of the ultraviolet ray screening agent include an ultraviolet ray screening agent containing a metal atom, an ultraviolet ray screening agent containing a metal oxide, an ultraviolet ray screening agent having a benzotriazole structure (benzotriazole compounds), an ultraviolet ray screening agent having a benzophenone structure (benzophenone compounds), an ultraviolet ray screening agent having a triazine structure (triazine compounds), an ultraviolet ray screening agent having a malonic acid ester structure (malonic acid ester compounds), an ultraviolet ray screening agent having an anilide oxalate structure (anilide oxalate compounds), and an ultraviolet ray screening agent having a benzoate structure (benzoate compounds).

Examples of the ultraviolet ray screening agent containing a metal atom include platinum particles, particles in which the surface of platinum particles is coated with silica, palladium particles, and particles in which the surface of palladium particles is coated with silica. The ultraviolet ray screening agent is preferably not heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and still more preferably an ultraviolet ray screening agent having a benzotriazole structure.

Examples of the ultraviolet ray screening agent containing a metal oxide include zinc oxide, titanium oxide, and cerium oxide. Furthermore, with regard to the ultraviolet ray screening agent containing a metal oxide, the surface thereof may be coated with any material. Examples of the coating material on the surface of the ultraviolet ray screening agent containing a metal oxide include insulating metal oxides, hydrolyzable organosilicon compounds, and silicone compounds.

Examples of the insulating metal oxide include silica, alumina, and zirconia. The insulating metal oxide has a band gap energy of, for example, 5.0 eV or more.

Examples of the ultraviolet ray screening agent having a benzotriazole structure include 2-(2'-hydroxy-5'-methylphenyl)benzotriazole ("Tinuvin P" manufactured by BASF SE), 2-(2'-hydroxy-3',5'-di-t-butylphenyl)benzotriazole ("Tinuvin 320" manufactured by BASF SE), 2-(2'-hydroxy-3'-t-butyl-5-methylphenyl)-5-chlorobenzotriazole ("Tinuvin 326" manufactured by BASF SE), and 2-(2'-hydroxy-3',5'-di-amylphenyl)benzotriazole ("Tinuvin 328" manufactured by BASF SE). The ultraviolet ray screening agent is preferably an ultraviolet ray screening agent having a benzotriazole structure including a halogen atom, and more preferably an ultraviolet ray screening agent having a benzotriazole structure including a chlorine atom because such an ultraviolet ray screening agent has an excellent ultraviolet shielding ability.

Examples of the ultraviolet ray screening agent having a benzophenone structure include octabenzone ("Chimassorb 81" manufactured by BASF SE).

Examples of the ultraviolet ray screening agent having a triazine structure include "LA-F70" manufactured by ADEKA Corporation and 2-(4,6-diphenyl-1,3,5-triazine-2-yl)-5-[(hexyl)oxy]-phenol ("Tinuvin 1577 FF" manufactured by BASF SE).

Examples of the ultraviolet ray screening agent having a malonic acid ester structure include dimethyl 2-(p-methoxybenzylidene)malonate, tetraethyl-2,2-(1,4-phenylenedimethylidene)bismalonate, and 2-(p-methoxybenzylidene)-bis (1,2,2,6,6-pentamethyl 4-piperidinyl)malonate.

Examples of the commercially available ultraviolet ray screening agent having a malonic acid ester structure include Hostavin B-CAP, Hostavin PR-25, and Hostavin PR-31 (all manufactured by Clariant AG).

Examples of the ultraviolet ray screening agent having an anilide oxalate structure include oxalic acid diamides having, for example, an aryl group substituted on a nitrogen atom, such as N-(2-ethylphenyl)-N'-(2-ethoxy-5-t-butylphenyl) oxalic acid diamide, N-(2-ethylphenyl)-N'-(2-ethoxyphenyl) oxalic acid diamide, and 2-ethyl-2'-ethoxy-oxyanilide ("Sanduvor VSU" manufactured by Clariant AG).

Examples of the ultraviolet ray screening agent having a benzoate structure include 2,4-di-tert-butylphenyl-3,5-di-tert-butyl-4-hydroxybenzoate ("Tinuvin 120" manufactured by BASF SE).

The content of the ultraviolet ray screening agent in 100% by weight of the layer containing the ultraviolet ray screening agent (colored layer or resin layer) is preferably 0.1% by weight or more, more preferably 0.2% by weight or more, still more preferably 0.3% by weight or more, and particularly preferably 0.5% by weight or more. The content of the ultraviolet ray screening agent in 100% by weight of the layer containing the ultraviolet ray screening agent (colored layer or resin layer) is preferably 2.5% by weight or less, more preferably 2% by weight or less, still more preferably 1% by weight or less, and particularly preferably 0.8% by weight or less. When the content of the ultraviolet ray screening agent is the above-described lower limit or more and the above-described upper limit or less, decrease in the visible light transmittance after the elapse of the period is further suppressed. In particular, by setting the content of the ultraviolet ray screening agent to be 0.2% by weight or more in 100% by weight of a layer containing the ultraviolet ray screening agent, the lowering in visible light transmittance of the laminated glass after the lapse of a certain period of time can be significantly suppressed.

Oxidation Inhibitor:

The colored layer preferably contains an oxidation inhibitor. The resin layer preferably contains an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, and a phosphorus-based oxidation inhibitor. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

The oxidation inhibitor is preferably a phenol-based oxidation inhibitor or a phosphorus-based oxidation inhibitor.

Examples of the phenol-based oxidation inhibitor include 2,6-di-t-butyl-p-cresol (BHT), butylhydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzene propanoate)ethylenebis(oxyethylene). One or more kinds of these oxidation inhibitors are suitably used.

Examples of the phosphorus-based oxidation inhibitor include tridecyl phosphite, tris(tridecyl)phosphite, triphenyl phosphite, trinonylphenyl phosphite, bis(tridecyl)pentaerythritol diphosphite, bis(decyl)pentaerythritol diphosphite, tris(2,4-di-t-butylphenyl)phosphite, bis(2,4-di-t-butyl-6-methylphenyl)ethyl phosphite, and 2,2'-methylenebis(4,6-di-t-butyl-1-phenyloxy)(2-ethylhexyloxy)phosphorus. One or more kinds of these oxidation inhibitors are suitably used.

Examples of the commercially available oxidation inhibitor include "IRGANOX 245" manufactured by BASF SE, "IRGAFOS 168" manufactured by BASF SE, "IRGAFOS 38" manufactured by BASF SE, "Sumilizer BHT" manufactured by Sumitomo Chemical Co., Ltd., "H-BHT" manufactured by Sakai Chemical Industry Co., Ltd., and "IRGANOX 1010" manufactured by BASF SE.

In order to maintain the high visible light transmittance of the laminated glass for a long period of time, the content of the oxidation inhibitor in 100% by weight of the layer containing the oxidation inhibitor (colored layer or resin layer) is preferably 0.1% by weight or more. Furthermore, the content of the oxidation inhibitor in 100% by weight of the layer containing the oxidation inhibitor is preferably 2% by weight or less.

Other Ingredients:

The colored layer and the resin layer may each contain an additive such as a coupling agent, a dispersant, a surfactant, a flame retardant, an antistatic agent, an adhesive force adjustment agent other than a metal salt, a moisture resistant agent, a fluorescent whitening agent, or an infrared ray absorbing agent if necessary. One kind of these additives may be used alone, and two or more kinds thereof may be used in combination.

Other Details of Interlayer Film:

The interlayer film preferably has a thickness of 0.1 mm or more, more preferably 0.25 mm or more, still more preferably 0.5 mm or more, and particularly preferably 0.8 mm or more, and preferably 3 mm or less, more preferably 2 mm or less, and still more preferably 1.5 mm or less.

The infrared reflective layer preferably has a thickness of 0.01 mm or more, more preferably 0.04 mm or more, and still more preferably 0.07 mm or more, and preferably 0.3 mm or less, more preferably 0.2 mm or less, still more preferably 0.18 mm or less, and particularly preferably 0.16 mm or less. When the infrared reflective layer has a thickness of the above-described lower limit or more, the laminated glass has a further high heat shielding property. When the infrared reflective layer has a thickness of the above-described upper limit or less, the laminated glass has further high transparency.

The colored layer preferably has a thickness of 0.1 mm or more, more preferably 0.2 mm or more, still more preferably 0.25 mm or more, and particularly preferably 0.3 mm or more, and preferably 1.0 mm or less, more preferably 0.6 mm or less, still more preferably 0.5 mm or less, still even more preferably 0.45 mm or less, and particularly preferably 0.4 mm or less. When the colored layer has a thickness of the above-described lower limit or more, the laminated glass has further high penetration resistance. When the colored layer has a thickness of the above-described upper limit or less, the laminated glass has further high transparency.

The resin layer preferably has a thickness of 0.1 mm or more, more preferably 0.2 mm or more, still more preferably 0.25 mm or more, and particularly preferably 0.3 mm or more, and preferably 1.0 mm or less, more preferably 0.6 mm or less, still more preferably 0.5 mm or less, still even more preferably 0.45 mm or less, and particularly preferably 0.4 mm or less. When the resin layer has a thickness of the above-described lower limit or more, the laminated glass has further high penetration resistance. When the resin layer has a thickness of the above-described upper limit or less, the laminated glass has further high transparency.

The interlayer film may have a uniform thickness or a varying thickness. The interlayer film may have a rectangular cross section or a wedge-shaped cross section.

The interlayer film may be wound to be formed into a roll body of the interlayer film. The roll body may include a winding core and an interlayer film wound on the outer periphery of the winding core.

The interlayer film preferably has a distance between one end and the other end of 3 m or less, more preferably 2 m or less, and particularly preferably 1.5 m or less, and preferably 0.5 m or more, more preferably 0.8 m or more, and particularly preferably 1 m or more.

The method for producing the interlayer film is not particularly limited. As the method for producing the interlayer film, a conventionally known method can be used. Examples of the method include production methods in which the above-described components are kneaded to form an interlayer film. A production method in which extrusion molding is performed is preferable because such a method is suitable for continuous production. In particular, the colored layer and the resin layer are preferably formed through extrusion molding.

The method of kneading is not particularly limited. Examples of the method include methods in which an extruder, a plastograph, a kneader, a Banbury mixer, a calender roll, or the like is used. Among the methods, a method in which an extruder is used is preferable, and a method in which a twin-screw extruder is used is more preferable because such a method is suitable for continuous production. The interlayer film may be obtained as follows. After preparing a colored layer, an infrared reflective layer, and a resin layer separately, the colored layer, the infrared reflective layer, and the resin layer are layered to obtain an interlayer film, or subjected to coextrusion for lamination to obtain an interlayer film.

Alternatively, the interlayer film may be obtained through coating the surface of an infrared reflective layer with compositions for formation of a colored layer and a resin layer to form a colored layer and a resin layer.

The colored layer and the resin layer preferably contain the same polyvinyl acetal resin, and more preferably contain the same polyvinyl acetal resin and the same plasticizer because in such a case, the production efficiency of the interlayer film is excellent.

(First and Second Lamination Glass Members)

Examples of the first and the second lamination glass members include glass plates and polyethylene terephthalate (PET) films. As the laminated glass, laminated glass in which an intermediate layer is sandwiched between a glass plate and a PET film or the like, as well as laminated glass in which an intermediate layer is sandwiched between two glass plates, is included. The laminated glass is a laminate including a glass plate, and it is preferable that at least one glass plate be used. It is preferable that the first and the second lamination glass members be each a glass plate or PET film, and the laminated glass contain at least one glass plate as the first or second lamination glass member. Both the first and the second lamination glass members are particularly preferably a glass plate.

Examples of the glass plate include inorganic glass and organic glass. Examples of the inorganic glass include float plate glass, heat ray absorbing plate glass, heat ray reflecting plate glass, polished plate glass, figured glass, wire-reinforced plate glass, and green glass. The organic glass is a synthetic resin glass that replaces the inorganic glass. Examples of the organic glass include polycarbonate plates and poly(meth)acrylic resin plates. Examples of the poly (meth)acrylic resin plate include polymethyl (meth)acrylate plates.

The first lamination glass member and the second lamination glass member are each preferably clear glass or heat ray absorbing plate glass. The first lamination glass member is preferably clear glass because clear glass has high infrared transmittance such that the laminated glass has a further high heat shielding property. The second lamination glass member is preferably heat ray absorbing plate glass because heat ray absorbing plate glass has low infrared transmittance such that the laminated glass has a further high heat shielding property. The heat ray absorbing plate glass is preferably green glass. It is preferable that the first lamination glass member be clear glass, and the second lamination glass member be heat ray absorbing plate glass. The heat ray absorbing plate glass conforms to JIS R 3208.

The first lamination glass member and the second lamination glass member each preferably has a thickness of 1 mm or more and preferably 5 mm or less, and more preferably 3 mm or less. Moreover, when the first and the second lamination glass members are a glass plate, the glass plate preferably has a thickness of 0.5 mm or more and more preferably 0.7 mm or more, and preferably 5 mm or less and more preferably 3 mm or less. When the first and the second lamination glass members are a PET film, the PET film preferably has a thickness of 0.03 mm or more and preferably 0.5 mm or less.

The first and the second lamination glass members may be curved, or need not be curved.

The method for producing the laminated glass for vehicle is not particularly limited. For example, the interlayer film is sandwiched between the first lamination glass member and the second lamination glass member, and the resulting product is passed through a pressing roll, or arranged in a rubber bag and subjected to vacuum suction to remove the air remaining between the first lamination glass member and the interlayer film and between the second lamination glass member and the interlayer film. Then, the product is subjected to preliminary pressure-bonding at about 70° C. to 110° C. to obtain a laminate. Next, the laminate is arranged in an autoclave or pressed to pressure-bond the layers in the laminate at about 120° C. to 150° C. under a pressure of 1 MPa to 1.5 MPa. In this way, a laminated glass for vehicle can be obtained.

(Other Details of Laminated Glass for Vehicle)

When the laminated glass for vehicle is used, the laminated glass is attached in an opening of a vehicle so that the first lamination glass member is positioned at the exterior side of the vehicle (outer space side) and the second lamination glass member is positioned at the interior side of the vehicle (inner space side) in the opening of the vehicle.

Specifically, the laminated glass is attached in the opening so that the first lamination glass member is positioned at the exterior side of the vehicle (outer space side) and the second lamination glass member is positioned at the interior side of the vehicle (inner space side). That is, the laminated glass is attached so that the exterior side of the vehicle/the first lamination glass member/the colored layer/the infrared reflective layer/(the resin layer/) the second lamination glass member/the interior side of the vehicle are arranged in this order. Configurations by the placement include a configuration in which another member is arranged between the exterior side of the vehicle and the first lamination glass member, and a configuration in which another member is arranged between the interior side of the vehicle and the second lamination glass member.

The vehicle according to the present invention includes a vehicle body and the above-described laminated glass for vehicle. The laminated glass for vehicle includes the first lamination glass member, the second lamination glass member, and the interlayer film. The interlayer film is arranged between the first lamination glass member and the second lamination glass member. In the vehicle according to the present invention, the first lamination glass member is positioned at the exterior side of the vehicle, and the second lamination glass member is positioned at the interior side of the vehicle.

The vehicle according to the present invention preferably includes the laminated glass for vehicle as the window glass of the vehicle.

Examples of the vehicle include automobiles, railway vehicles, aircraft, and ships. Examples of the vehicle body include automobile bodies, railway vehicle bodies, aircraft bodies, and ship bodies.

The laminated glass for vehicle may have a curved and protruded surface, or need not have a surface that is not curved. The laminated glass for vehicle may have a protruded surface, and the protruded surface may be the outer surface of the first lamination glass member. In this case, the first lamination glass member may have a larger radius of curvature than the second lamination glass member. The laminated glass for vehicle preferably has a protruded surface on one side and a flat or recessed surface on the other side. The laminated glass for vehicle preferably has a protruded surface on one side and a recessed surface on the other side. The recessed surface may be the outer surface of the second lamination glass member.

The laminated glass for vehicle can be used for a windshield, side glass, rear glass, or roof glass of a vehicle, and the like. The laminated glass for vehicle is suitably used for automobiles. The laminated glass for vehicle is suitably used for obtaining a laminated glass for automobiles. The laminated glass for vehicle is suitably used as a windshield, side glass, rear glass, and roof glass of an automobile.

The windshield sometimes has a protruded surface.

The laminated glass for vehicle may be a head-up display. The laminated glass for vehicle may have a display area of a head-up display.

Hereinafter, the present invention will be described in more detail with reference to examples and comparative examples. The present invention is not limited to these examples.

n-Butyraldehyde, which has four carbon atoms, is used for acetalization in the used polyvinyl acetal resin. The acetalization degree (butyralization degree), the acetylation degree, and the hydroxyl group content of the polyvinyl acetal resin were measured by a method in accordance with JIS K 6728 "Testing methods for polyvinyl butyral". Even when measurement was performed in accordance with ASTM D1396-92, the results showed the same values as those obtained with the method in accordance with JIS K 6728 "Testing methods for polyvinyl butyral".

The following materials were prepared.

(Thermoplastic Resin)

Polyvinyl acetal resin (PVB, average polymerization degree: 1,700, hydroxyl group content: 30.5 mol %, acetylation degree: 1 mol %, acetalization degree: 68.5 mol %)

(Plasticizer)

Triethylene glycol di-2-ethylhexanoate (3GO)

(Heat Shielding Particles)

ITO particle

CWO particle (Ultraviolet Ray Screening Agent)

Tinuvin 326 (2-(2'-hydroxy-3'-t-butyl-5-methylphenyl)-5-chlorobenzotriazole, "Tinuvin 326" manufactured by BASF SE)

(Oxidation Inhibitor)

BHT (2,6-di-t-butyl-p-cresol)

(Coloring Agent)

Carbon black ("FW-200 carbon" manufactured by Orion Engineered Carbons, average particle size: 1 µm)

Phthalocyanine compound ("Cyanine Blue 5029" manufactured by Dainichiseika Color & Chemicals Mfg. Co., Ltd.)

Indanthrene ("Cromophtal Blue A3R" manufactured by Dominion Colour Corporation)

Graphene ("Graphene ink" manufactured by Sigma-Aldrich Co. LLC.)

Titanium black ("12S" manufactured by Mitsubishi Materials Electronic Chemicals Co., Ltd.)

Aniline black ("No. 3 Aniline Black" manufactured by TOKYO SHIKIZAI INDUSTRY CO., LTD.)

The following infrared reflective layer was prepared.

(Infrared Reflective Layer)

Nano 90S (3M, ultra-multilayer resin film, "Multilayer Nano 90S" manufactured by Sumitomo 3M Limited)

The following lamination glass members were prepared.

(Lamination Glass Member)

Clear glass (thickness: 2.5 mm)

Example 1

Preparation of Colored Layer:

The following components were mixed and sufficiently kneaded with a mixing roll to obtain a composition for formation of a colored layer.

Polyvinyl acetal resin (PVB, average polymerization degree: 1,700, hydroxyl group content: 30.5 mol %, acetylation degree: 1 mol %, acetalization degree: 68.5 mol %): 100 parts by weight Triethylene glycol di-2-ethylhexanoate (3GO): 40 parts by weight Carbon black in an amount of 0.008% by weight in the colored layer to be obtained Tinuvin 326 (2-(2'-hydroxy-3'-t-butyl-5-methylphenyl)-5-chlorobenzotriazole, "Tinuvin 326" manufactured by BASF SE) in an amount of 0.2% by weight in the colored layer to be obtained BHT (2,6-di-t-butyl-p-cresol) in an amount of 0.2% by weight in the colored layer to be obtained The obtained composition for formation of a colored layer was extruded by an extruder to obtain a colored layer having a thickness shown in Table 1 below.

Preparation of Resin Layer:

The following components were mixed and sufficiently kneaded with a mixing roll to obtain a composition for formation of a resin layer.

Polyvinyl acetal resin (PVB, average polymerization degree: 1,700, hydroxyl group content: 30.5 mol %, acetylation degree: 1 mol %, acetalization degree: 68.5 mol %): 100 parts by weight Triethylene glycol di-2-ethylhexanoate (3GO): 40 parts by weight Tinuvin 326 (2-(2'-hydroxy-3'-t-butyl-5-methylphenyl)-5-chlorobenzotriazole, "Tinuvin 326" manufactured by BASF SE) in an amount of 0.2% by weight in the resin layer to be obtained BHT (2,6-di-t-butyl-p-cresol) in an amount of 0.2% by weight in the resin layer to be obtained The obtained composition for formation of a resin layer was extruded by an extruder to obtain a colored layer having a thickness shown in Table 1 below.

Preparation of infrared reflective layer, and first and second lamination glass members:

Nano 90S was prepared as an infrared reflective layer.

Clear glass (thickness: 2.5 mm) was prepared as first and second lamination glass members.

Preparation of Laminated Glass for Vehicle:

The first lamination glass member, the colored layer, the infrared reflective layer, the resin layer, and the second lamination glass member were layered in this order to obtain a laminated glass for vehicle that has a structure of the first lamination glass member/the colored layer/the infrared reflective layer/the resin layer/the second lamination glass member.

Examples 2 to 19

A laminated glass for vehicle that has a structure of the first lamination glass member/the colored layer/the infrared reflective layer/the resin layer/the second lamination glass member was obtained in the same manner as in Example 1 except that the composition of the interlayer film was changed to the composition shown in Tables 1, 2, and 5 below. The interlayer films prepared in Examples 2 to 19 as well as the interlayer film prepared in Example 1 contain an ultraviolet ray screening agent and an oxidation inhibitor.

Comparative Example 1

A colored layer and a resin layer were obtained in the same manner as in Example 1. The first lamination glass member, the resin layer, the infrared reflective layer, the colored layer, and the second lamination glass member were layered in this order to obtain a laminated glass for vehicle that has a structure of the first lamination glass member/the resin layer/the infrared reflective layer/the colored layer/the second lamination glass member. The interlayer film prepared in Comparative Example 1 as well as the interlayer film prepared in Example 1 contains an ultraviolet ray screening agent and an oxidation inhibitor.

Comparative Examples 2 to 7, 12, and 13

A laminated glass for vehicle that has a structure of the first lamination glass member/the resin layer/the infrared reflective layer/the colored layer/the second lamination glass member was obtained in the same manner as in Comparative Example 1 except that the composition of the interlayer film was changed to the composition shown in Tables 3 and 6 below. The interlayer films prepared in Comparative Examples 2 to 7, 12, and 13 as well as the interlayer film prepared in Example 1 contain an ultraviolet ray screening agent and an oxidation inhibitor.

Comparative Examples 8 to 11

A laminated glass for vehicle that has a structure of the first lamination glass member/the colored layer/the infrared reflective layer/the resin layer/the second lamination glass member was obtained in the same manner as in Example 1 except that the composition of the interlayer film was changed to the composition shown in Table 4 below. The interlayer films prepared in Comparative Examples 8 to 11 as well as the interlayer film prepared in Example 1 contain an ultraviolet ray screening agent and an oxidation inhibitor.

(Evaluation)

(1) Measurement of Absorbance of Laminate

The obtained colored layer and resin layer were used to prepare a laminate (1) having a structure of clear float glass/the colored layer/clear float glass and a laminate (2) having a structure of clear float glass/the resin layer/clear float glass in accordance with the following procedure.

The obtained colored layer was sandwiched between two layers of clear float glass having a thickness of 2.5 mm to obtain a laminate before pressure bonding. The obtained laminate before pressure bonding was put in a rubber bag, the rubber bag was degassed at a vacuum degree of 2.6 kPa for 20 minutes, then transferred into an oven in the degassed state, and held at 90° C. for 30 minutes for vacuum press to preliminarily pressure-bond the layers in the laminate before pressure bonding. After the preliminary pressure-bonding, the laminate before pressure bonding was subjected to pressure-bonding in an autoclave under the conditions of a temperature of 135° C. and a pressure of 1.2 MPa for 20 minutes to obtain a laminate (1).

A laminate (2) was obtained with the same method as described above using the obtained resin layer instead of the obtained colored layer.

The absorbances of the obtained laminates (1) and (2) at a wavelength of 650 nm ($A_{650}$), 550 nm ($A_{550}$), and 450 nm ($A_{450}$) were measured using a spectrophotometer ("U-4100" manufactured by Hitachi High-Tech Corporation). From the obtained absorbances, the following ratios were calculated.

$A_{650}/A_{550}$ (Ratio of absorbance of laminate (1) or (2) at wavelength of 650 nm to absorbance of laminate (1) or (2) at wavelength of 550 nm)

$A_{650}/A_{450}$ (Ratio of absorbance of laminate (1) or (2) at wavelength of 650 nm to absorbance of laminate (1) or (2) at wavelength of 450 nm)

$A_{550}/A_{450}$ (Ratio of absorbance of laminate (1) or (2) at wavelength of 550 nm to absorbance of laminate (1) or (2) at wavelength of 450 nm)

(2) Visible Light Transmittance of Laminate

The visible light transmittances at a wavelength of 380 nm to 780 nm of the obtained laminates (1) and (2) were measured using a spectrophotometer ("U-4100" manufactured by Hitachi High-Tech Corporation) in accordance with JIS R 3106: 1998.

(3) Visible Light Transmittance of Laminated Glass

The visible light transmittance at a wavelength of 380 nm to 780 nm of the obtained laminated glass was measured using a spectrophotometer ("U-4100" manufactured by Hitachi High-Tech Corporation) in accordance with JIS R 3106: 1998.

(4) Measurement of Solar Transmittance (Initial Ts2500 (300 nm to 2500 nm))

The solar transmittance Ts (Ts2500) at a wavelength of 300 nm to 2,500 nm of the obtained laminated glass was measured using a spectrophotometer ("U-4100" manufactured by Hitachi High-Tech Corporation) in accordance with JIS R 3106: 1998.

(5) Transmitted Color

The transmitted color of the obtained laminated glass was measured using a spectrophotometer ("U-4100" manufactured by Hitachi High-Tech Corporation) in accordance with JIS Z 8701: 1999. The measurement was performed under the condition of a 10-degree field of view using a D65 light source as a standard light source.

(6) Coloring of Reflected Light

The transmitted color of the obtained laminated glass was measured using a spectrophotometer ("U-4100" manufactured by Hitachi High-Tech Corporation) in accordance with JIS Z 8701: 1999. The measurement was performed under the condition of a 10-degree field of view using a D65 light source as a standard light source.

(7) Coloring of Water Droplet

Water was dripped on the outer surface of the first lamination glass member of the obtained laminated glass. The coloring of the water droplet was visually observed in an environment where the background color was dark and an environment where the background color was light.

[Criteria for Coloring of Water Droplet]
  ○: Coloring of water droplet is not perceived
  ×: Coloring of water droplets is perceived FIGS. 3(a), 3(b), 3(c), and 3(d) are photographs showing the observation results of the laminated glass for vehicle obtained in Examples. FIGS. 3(a), 3(b), 3(c), and 3(d) are photographs showing the observation results in the case of the determination result of "○".

FIG. 3(a) is a photograph showing the observation result of the laminated glass obtained in Example 1. FIG. 3(b) is a photograph showing the observation result of the laminated glass obtained in Example 2. FIG. 3(c) is a photograph showing the observation result of the laminated glass obtained in Example 3. FIG. 3(d) is a photograph showing the observation result of the laminated glass obtained in Example 10. FIGS. 3(a), 3(b), and 3(c) are photographs showing the observation results of the laminated glass observed in an environment where the background color was dark. FIG. 3(d) is a photograph showing the observation result of the laminated glass observed in an environment where the background color was light. In FIGS. 3(a), 3(b), 3(c), and 3(d), no coloring is perceived in the water droplet dripped on the outer surface of the first lamination glass member.

FIGS. 4(a), 4(b), 4(c), 4(d), and 4(e) are photographs showing the observation results of the laminated glass for vehicle obtained in Comparative Examples. FIGS. 4(a), 4(b), 4(c), 4(d), and 4(e) are photographs showing the observation results in the case of the determination result of "×".

FIG. 4(a) is a photograph showing the observation result of the laminated glass obtained in Comparative Example 1. FIG. 4(b) is a photograph showing the observation result of the laminated glass obtained in Comparative Example 2. FIG. 4(c) is a photograph showing the observation result of the laminated glass obtained in Comparative Example 3. FIG. 4(d) is a photograph showing the observation result of the laminated glass obtained in Comparative Example 4. FIG. 4(e) is a photograph showing the observation result of the laminated glass obtained in Comparative Example 8. FIGS. 4(a), 4(b), and 4(c) are photographs showing the observation results of the laminated glass observed in an environment where the background color was dark. FIGS. 4(d) and 4(e) are photographs showing the observation results of the laminated glass observed in an environment where the background color was light. In FIGS. 4(a), 4(b), and 4(c), reddish brown coloring was perceived in the water droplet dripped on the outer surface of the first lamination glass member. In FIGS. 4(d) and 4(e), rainbow coloring was perceived in the water droplet dripped on the outer surface of the first lamination glass member. In FIGS. 4(a), 4(b), 4(c), 4(d), and 4(e), a part or the region of the water droplet in which coloring was perceived is indicated with an arrow or a circle.

Tables 1 to 6 described below show the details and the results. In Tables, the description of the ultraviolet ray screening agent and the oxidation inhibitor is omitted. In Tables, the content of the coloring agent and the content of the heat shielding particles are each the content in 100% by weight of the colored layer or resin layer.

TABLE 1

| | | | | Example 1 | Example 2 | Example 3 | Example 4 | Example 5 | Example 6 |
|---|---|---|---|---|---|---|---|---|---|
| Configuration | First lamination glass member (exterior side of vehicle) | | Kind | Clear glass | Clear glass | Clear glass | Clear glass | Clear glass | Clear glass |
| | Colored layer | Thermoplastic resin | Kind | PVB | PVB | PVB | PVB | PVB | PVB |
| | | | Parts by weight | 100 | 100 | 100 | 100 | 100 | 100 |
| | | Plasticizer | Kind | 3GO | 3GO | 3GO | 3GO | 3GO | 3GO |
| | | | Parts by weight | 40 | 40 | 40 | 40 | 40 | 40 |
| | | Coloring agent | Kind | Carbon black | Carbon black | Carbon black | Carbon black | Carbon black | Carbon black |
| | | | % by weight | 0.008 | 0.008 | 0.008 | 0.019 | 0.019 | 0.019 |
| | | Thickness | μm | 769 | 769 | 769 | 775 | 775 | 775 |
| | | A650/A550 of laminate | — | — | 0.9 | 0.9 | 0.9 | 0.8 | 0.8 | 0.8 |
| | | A650/A450 of laminate | — | — | 0.9 | 0.9 | 0.9 | 0.8 | 0.8 | 0.8 |

TABLE 1-continued

|  |  |  |  | Example 1 | Example 2 | Example 3 | Example 4 | Example 5 | Example 6 |
|---|---|---|---|---|---|---|---|---|---|
|  |  | A550/A450 of laminate | — | 1.0 | 1.0 | 1.0 | 0.9 | 0.9 | 0.9 |
|  |  | Visible light transmittance of laminate | % | 18.9 | 18.9 | 18.9 | 8.6 | 8.6 | 8.6 |
|  | Infrared reflective layer | Kind |  | Ultra-multilayer resin film | Ultra-multilayer resin film | Ultra-multilayer resin film | Ultra-multilayer resin film | Ultra-multilayer resin film | Ultra-multilayer resin film |
|  | Resin layer | Thermoplastic resin | Kind | PVB | PVB | PVB | PVB | PVB | PVB |
|  |  |  | Parts by weight | 100 | 100 | 100 | 100 | 100 | 100 |
|  |  | Plasticizer | Kind | 3GO | 3GO | 3GO | 3GO | 3GO | 3GO |
|  |  |  | Parts by weight | 40 | 40 | 40 | 40 | 40 | 40 |
|  |  | Heat shielding particles | Kind | — | ITO particle | ITO particle | — | ITO particle | ITO particle |
|  |  |  | % by weight | — | 0.15 | 0.45 | — | 0.15 | 0.45 |
|  |  | Thickness | μm | 773 | 780 | 762 | 773 | 780 | 762 |
|  |  | A650/A550 of laminate | — | 1.3 | 1.3 | 1.6 | 1.3 | 1.3 | 1.6 |
|  |  | A650/A450 of laminate | — | 1.1 | 1.1 | 1.2 | 1.1 | 1.1 | 1.2 |
|  |  | A550/A450 of laminate | — | 0.9 | 0.8 | 0.8 | 0.9 | 0.8 | 0.8 |
|  |  | Visible light transmittance of laminate | % | 87.1 | 87.6 | 86.1 | 87.1 | 87.6 | 86.1 |
|  | Second lamination glass member (interior side of vehicle) | Kind |  | Clear glass | Clear glass | Clear glass | Clear glass | Clear glass | Clear glass |
| Evaluation | Visible light transmittance |  | % | 17.5 | 17.2 | 16.1 | 8.5 | 8.4 | 7.8 |
|  | Solar transmittance |  | % | 23.6 | 17.7 | 12.8 | 15.0 | 10.7 | 7.5 |
|  | Transmitted color | Transmission a* | — | −4.1 | −4.3 | −5.3 | −2.6 | −2.7 | −3.6 |
|  |  | Transmission b* | — | 3.1 | 3.3 | 3.5 | 5.1 | 5.3 | 5.3 |
|  | Coloring of reflected light | Reflection a* | — | −0.3 | −0.3 | −0.3 | −0.1 | −0.1 | −0.1 |
|  |  | Reflection b* | — | −0.7 | −0.7 | −0.6 | −0.5 | −0.6 | −0.5 |
|  | Coloring of water droplet | Determination |  | ○ | ○ | ○ | ○ | ○ | ○ |

TABLE 2

|  |  |  |  | Example 7 | Example 8 | Example 9 | Example 10 | Example 11 | Example 12 |
|---|---|---|---|---|---|---|---|---|---|
| Configuration | First lamination glass member (exterior side of vehicle) | Kind |  | Clear glass | Clear glass | Clear glass | Clear glass | Clear glass | Clear glass |
|  | Colored layer | Thermoplastic resin | Kind | PVB | PVB | PVB | PVB | PVB | PVB |
|  |  |  | Parts by weight | 100 | 100 | 100 | 100 | 100 | 100 |
|  |  | Plasticizer | Kind | 3GO | 3GO | 3GO | 3GO | 3GO | 3GO |
|  |  |  | Parts by weight | 40 | 40 | 40 | 40 | 40 | 40 |
|  |  | Coloring agent | Kind | Carbon black | Carbon black | Carbon black | Carbon black | Carbon black | Carbon black |
|  |  |  | % by weight | 0.095 | 0.095 | 0.095 | 0.001 | 0.001 | 0.001 |
|  |  | Thickness | μm | 771 | 771 | 771 | 764 | 764 | 764 |
|  |  | A650/A550 of laminate | — | 0.9 | 0.9 | 0.9 | 1.4 | 1.4 | 1.4 |
|  |  | A650/A450 of laminate | — | 0.8 | 0.8 | 0.8 | 1.3 | 1.3 | 1.3 |
|  |  | A550/A450 of laminate | — | 0.9 | 0.9 | 0.9 | 0.9 | 0.9 | 0.9 |
|  |  | Visible light transmittance of laminate | % | 1.9 | 1.9 | 1.9 | 78.6 | 78.6 | 78.6 |
|  | Infrared reflective layer | Kind |  | Ultra-multilayer resin film | Ultra-multilayer resin film | Ultra-multilayer resin film | Ultra-multilayer resin film | Ultra-multilayer resin film | Ultra-multilayer resin film |
|  | Resin layer | Thermoplastic resin | Kind | PVB | PVB | PVB | PVB | PVB | PVB |
|  |  |  | Parts by weight | 100 | 100 | 100 | 100 | 100 | 100 |
|  |  | Plasticizer | Kind | 3GO | 3GO | 3GO | 3GO | 3GO | 3GO |
|  |  |  | Parts by weight | 40 | 40 | 40 | 40 | 40 | 40 |
|  |  | Heat shielding particles | Kind | — | ITO particle | ITO particle | — | ITO particle | ITO particle |
|  |  |  | % by weight | — | 0.15 | 0.45 | — | 0.15 | 0.45 |
|  |  | Thickness | μm | 773 | 780 | 762 | 773 | 780 | 762 |
|  |  | A650/A550 of laminate | — | 1.3 | 1.3 | 1.6 | 1.3 | 1.3 | 1.6 |
|  |  | A650/A450 of laminate | — | 1.1 | 1.1 | 1.2 | 1.1 | 1.1 | 1.2 |
|  |  | A550/A450 of laminate | — | 0.9 | 0.8 | 0.8 | 0.9 | 0.8 | 0.8 |
|  |  | Visible light transmittance of laminate | % | 87.1 | 87.6 | 86.1 | 87.1 | 87.6 | 86.1 |
|  | Second lamination glass member (interior side of vehicle) | Kind |  | Clear glass | Clear glass | Clear glass | Clear glass | Clear glass | Clear glass |

TABLE 2-continued

|  |  |  | Example 7 | Example 8 | Example 9 | Example 10 | Example 11 | Example 12 |
|---|---|---|---|---|---|---|---|---|
| Evaluation | Visible light transmittance | % | 1.7 | 1.7 | 1.6 | 77.5 | 76.2 | 71.5 |
|  | Solar transmittance | % | 7.1 | 4.2 | 2.6 | 53.3 | 45.5 | 38.2 |
|  | Transmitted color | Transmission a* | — | -2.1 | -2.2 | -2.8 | -2.8 | -3.4 | -3.4 |
|  |  | Transmission b* | — | 4.7 | 4.7 | 4.8 | 1.6 | 2.5 | 0.5 |
|  | Coloring of reflected light | Reflection a* | — | 0.1 | 0.1 | 0.1 | 3.6 | 3.7 | 3.7 |
|  |  | Reflection b* | — | -0.4 | -0.4 | -0.5 | -5.4 | -5.3 | -5.1 |
|  | Coloring of water droplet | Determination | ○ | ○ | ○ | ○ | ○ | ○ |

TABLE 3

|  |  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Configuration | First lamination glass member (exterior side of vehicle) | | Kind | Clear glass | Clear glass | Clear glass | Clear glass | Clear glass | Clear glass | Clear glass |
|  | Resin layer | Thermoplastic resin | Kind | PVB | PVB | PVB | PVB | PVB | PVB | PVB |
|  |  |  | Parts by weight | 100 | 100 | 100 | 100 | 100 | 100 | 100 |
|  |  | Plasticizer | Kind | 3GO | 3GO | 3GO | 3GO | 3GO | 3GO | 3GO |
|  |  |  | Parts by weight | 40 | 40 | 40 | 40 | 40 | 40 | 40 |
|  |  | Heat shielding particles | Kind | — | ITO particle | ITO particle | — | ITO particle | ITO particle | — |
|  |  |  | % by weight | — | 0.15 | 0.45 | — | 0.15 | 0.45 | — |
|  |  | Thickness | μm | 773 | 780 | 762 | 773 | 780 | 762 | 773 |
|  |  | A650/A550 of laminate | — | 1.3 | 1.3 | 1.6 | 1.3 | 1.3 | 1.6 | 1.3 |
|  |  | A650/A450 of laminate | — | 1.1 | 1.1 | 1.2 | 1.1 | 1.1 | 1.2 | 1.1 |
|  |  | A550/A450 of laminate | — | 0.9 | 0.8 | 0.8 | 0.9 | 0.8 | 0.8 | 0.9 |
|  |  | Visible light transmittance of laminate | % | 87.1 | 87.6 | 86.1 | 87.1 | 87.6 | 86.1 | 87.1 |
|  | Infrared reflective layer | | Kind | Ultra-multilayer resin film | Ultra-multilayer resin film | Ultra-multilayer resin film | Ultra-multilayer resin film | Ultra-multilayer resin film | Ultra-multilayer resin film | Ultra-multilayer resin film |
|  | Colored layer | Thermoplastic resin | Kind | PVB | PVB | PVB | PVB | PVB | PVB | PVB |
|  |  |  | Parts by weight | 100 | 100 | 100 | 100 | 100 | 100 | 100 |
|  |  | Plasticizer | Kind | 3GO | 3GO | 3GO | 3GO | 3GO | 3GO | 3GO |
|  |  |  | Parts by weight | 40 | 40 | 40 | 40 | 40 | 40 | 40 |
|  |  | Coloring agent | Kind | Carbon black | Carbon black | Carbon black | — | Carbon black | Carbon black | Carbon black |
|  |  |  | % by weight | 0.008 | 0.008 | 0.008 | — | 0.095 | 0.095 | 0.095 |
|  |  | Thickness | μm | 769 | 769 | 769 | 779 | 771 | 771 | 771 |
|  |  | A650/A550 of laminate | — | 0.88 | 0.88 | 0.88 | 1.3 | 0.85 | 0.85 | 0.85 |
|  |  | A650/A450 of laminate | — | 0.86 | 0.86 | 0.86 | 1.1 | 0.8 | 0.8 | 0.8 |
|  |  | A550/A450 of laminate | — | 0.97 | 0.97 | 0.97 | 0.9 | 0.94 | 0.94 | 0.94 |
|  |  | Visible light transmittance of laminate | % | 18.9 | 18.9 | 18.9 | 87.1 | 1.9 | 1.9 | 1.9 |
|  | Second lamination glass member (interior side of vehicle) | | Kind | Clear glass | Clear glass | Clear glass | Clear glass | Clear glass | Clear glass | Clear glass |
| Evaluation | Visible light transmittance | | % | 17.5 | 17.2 | 16.1 | 87.6 | 1.7 | 1.6 | 1.7 |
|  | Solar transmittance | | % | 23.6 | 17.7 | 12.8 | 62.3 | 4.2 | 2.6 | 7.1 |
|  | Transmitted color | Transmission a* | — | -4.1 | -4.3 | -5.3 | -2.4 | -2.2 | -2.8 | -2.1 |
|  |  | Transmission b* | — | 3.1 | 3.3 | 3.5 | 3.9 | 4.7 | 4.8 | 4.7 |
|  | Coloring of reflected light | Reflection a* | — | 10.8 | 10.6 | 10.1 | 2.5 | 13.6 | 13.4 | 13.3 |
|  |  | Reflection b* | — | -17.6 | -17.8 | -17.1 | -7.8 | -21.4 | -21.6 | -21.4 |
|  | Coloring of water droplet | | Determination | x | x | x | x | x | x | x |

TABLE 4

| | | | Comparative Example 8 | Comparative Example 9 | Comparative Example 10 | Comparative Example 11 |
|---|---|---|---|---|---|---|
| Configuration | First lamination glass member (exterior side of vehicle) | Kind | Clear glass | Clear glass | Clear glass | Clear glass |
| | Colored layer | Thermoplastic resin | Kind | PVB | PVB | PVB | PVB |
| | | | Parts by weight | 100 | 100 | 100 | 100 |
| | | Plasticizer | Kind | 3GO | 3GO | 3GO | 3GO |
| | | | Parts by weight | 40 | 40 | 40 | 40 |
| | | Heat shielding particles | Kind | — | ITO particle | ITO particle | — |
| | | | % by weight | — | 0.75 | 1.05 | — |
| | | Coloring agent | Kind | Phthalocyanine | Phthalocyanine | Phthalocyanine | Indanthrene |
| | | | % by weight | 0.0028 | 0.0028 | 0.0028 | 0.012 |
| | | Thickness | μm | 776 | 776 | 776 | 789 |
| | | A650/A550 of laminate | — | 2.5 | 2.5 | 2.5 | 1.12 |
| | | A650/A450 of laminate | — | 3.5 | 3.5 | 3.5 | 3.05 |
| | | A550/A450 of laminate | — | 1.4 | 1.4 | 1.4 | 2.73 |
| | | Visible light transmittance of laminate | % | 79.6 | 79.6 | 79.6 | 68.4 |
| | Infrared reflective layer | Kind | | Ultra-multilayer resin film | Ultra-multilayer resin film | Ultra-multilayer resin film | Ultra-multilayer resin film |
| | Resin layer | Thermoplastic resin | Kind | PVB | PVB | PVB | PVB |
| | | | Parts by weight | 100 | 100 | 100 | 100 |
| | | Plasticizer | Kind | 3GO | 3GO | 3GO | 3GO |
| | | | Parts by weight | 40 | 40 | 40 | 40 |
| | | Heat shielding particles | Kind | — | ITO particle | ITO particle | ITO particle |
| | | | % by weight | — | 0.15 | 0.45 | 0.15 |
| | | Thickness | μm | 773 | 780 | 762 | 755 |
| | | A650/A550 of laminate | — | 1.3 | 1.3 | 1.6 | 1.3 |
| | | A650/A450 of laminate | — | 1.1 | 1.1 | 1.2 | 1.1 |
| | | A550/A450 of laminate | — | 0.9 | 0.8 | 0.8 | 0.8 |
| | | Visible light transmittance of laminate | % | 87.1 | 87.6 | 86.1 | 87.6 |
| | Second lamination glass member (interior side of vehicle) | Kind | | Clear glass | Clear glass | Clear glass | Clear glass |
| Evaluation | Visible light transmittance | | % | 77.5 | 77.1 | 76.1 | 73.2 |
| | Solar transmittance | | % | 46.6 | 38.3 | 31.1 | 54.2 |
| | Transmitted color | Transmission a* | — | −7.6 | −7.7 | −6.7 | −2.3 |
| | | Transmission b* | — | −6.4 | −6.2 | −5.6 | −4.7 |
| | Coloring of reflected light | Reflection a* | — | 5.9 | 6.0 | 5.9 | 6.8 |
| | | Reflection b* | — | −11.9 | −12.1 | −12.1 | −10.3 |
| | Coloring of water droplet | Determination | | x | x | x | x |

TABLE 5

| | | | | Example 13 | Example 14 | Example 15 | Example 16 | Example 17 | Example 18 | Example 19 |
|---|---|---|---|---|---|---|---|---|---|---|
| Configuration | First lamination glass member (exterior side of vehicle) | Kind | | Clear glass | Clear glass | Clear glass | Clear glass | Clear glass | Clear glass | Clear glass |
| | Colored layer | Thermoplastic resin | Kind | PVB | PVB | PVB | PVB | PVB | PVB | PVB |
| | | | Parts by weight | 100 | 100 | 100 | 100 | 100 | 100 | 100 |
| | | Plasticizer | Kind | 3GO | 3GO | 3GO | 3GO | 3GO | 3GO | 3GO |
| | | | Parts by weight | 40 | 40 | 40 | 40 | 40 | 40 | 40 |
| | | Coloring agent | Kind | Carbon black | Carbon black | Graphene | Titanium black | Aniline black | Carbon black | Carbon black |
| | | | % by weight | 0.095 | 0.001 | 0.019 | 0.023 | 0.12 | 0.008 | 0.001 |
| | | | Kind | — | — | — | — | — | Phthalocyanine | Phthalocyanine |
| | | | % by weight | — | — | — | — | — | 0.0028 | 0.0009 |
| | | Thickness | μm | 760 | 781 | 777 | 767 | 771 | 769 | 765 |
| | | A650/A550 of laminate | — | — | 0.9 | 1.4 | 1.0 | 1.2 | 0.9 | 0.7 | 0.8 |
| | | A650/A450 of laminate | — | — | 0.8 | 1.26 | 1.1 | 1.2 | 1.0 | 0.6 | 0.7 |

TABLE 5-continued

|  |  |  | Example 13 | Example 14 | Example 15 | Example 16 | Example 17 | Example 18 | Example 19 |
|---|---|---|---|---|---|---|---|---|---|
|  |  | A550/A450 of laminate | — | 0.9 | 0.9 | 1.0 | 1.1 | 0.9 | 0.7 | 0.8 |
|  |  | Visible light transmittance of laminate | % | 1.9 | 78.6 | 7.1 | 9.8 | 8.8 | 16.5 | 78.3 |
|  | Infrared reflective layer | Kind |  | Ultra-multilayer resin film | Ultra-multilayer resin film | Ultra-multilayer resin film | Ultra-multilayer resin film | Ultra-multilayer resin film | Ultra-multilayer resin film | Ultra-multilayer resin film |
|  | Resin layer | Thermoplastic resin | Kind | PVB | PVB | PVB | PVB | PVB | PVB | PVB |
|  |  |  | Parts by weight | 100 | 100 | 100 | 100 | 100 | 100 | 100 |
|  |  | Plasticizer | Kind | 3GO | 3GO | 3GO | 3GO | 3GO | 3GO | 3GO |
|  |  |  | Parts by weight | 40 | 40 | 40 | 40 | 40 | 40 | 40 |
|  |  | Heat shielding particles | Kind | CWO particle | CWO particle | ITO particle | ITO particle | ITO particle | ITO particle | ITO particle |
|  |  |  | % by weight | 0.04 | 0.08 | 0.15 | 0.15 | 0.45 | 0.015 | 0.45 |
|  |  | Thickness | μm | 768 | 772 | 774 | 768 | 777 | 781 | 788 |
|  |  | A650/A550 of laminate | — | 0.9 | 0.9 | 1.3 | 1.3 | 1.6 | 1.3 | 1.6 |
|  |  | A650/A450 of laminate | — | 0.9 | 0.9 | 1.1 | 1.1 | 1.2 | 1.1 | 1.2 |
|  |  | A550/A450 of laminate | — | 0.9 | 0.9 | 0.8 | 0.8 | 0.8 | 0.8 | 0.8 |
|  |  | Visible light transmittance of laminate | % | 84.0 | 79.9 | 87.6 | 87.6 | 86.1 | 87.6 | 86.1 |
|  | Second lamination glass member (interior side of vehicle) | Kind |  | Clear glass | Clear glass | Clear glass | Clear glass | Clear glass | Clear glass | Clear glass |
| Evaluation | Visible light transmittance | % |  | 1.6 | 61.9 | 6.5 | 8.2 | 8.1 | 16.2 | 77.3 |
|  | Solar transmittance | % |  | 3.8 | 34.3 | 9.8 | 10.3 | 11.2 | 11.2 | 38.2 |
|  | Transmitted color | Transmission a* | — | −4.1 | −4.9 | −2.5 | −1.8 | −3.1 | −2.4 | −3.6 |
|  |  | Transmission b* | — | 3.1 | 3.1 | 3.1 | 2.8 | 2.2 | 4.9 | 0.9 |
|  | Coloring of reflected light | Reflection a* | — | −0.2 | −0.2 | −0.1 | −0.2 | −0.7 | −0.1 | 3.7 |
|  |  | Reflection b* | — | −0.4 | −0.1 | −0.6 | −0.6 | −0.1 | −0.6 | −4.3 |
|  | Coloring of water droplet | Determination |  | ○ | ○ | ○ | ○ | ○ | ○ | ○ |

TABLE 6

|  |  |  |  | Comparative Example 12 | Comparative Example 13 |
|---|---|---|---|---|---|
| Configuration | First lamination glass member (exterior side of vehicle) | Kind |  | Clear glass | Clear glass |
|  | Resin layer | Thermoplastic resin | Kind | PVB | PVB |
|  |  |  | Parts by weight | 100 | 100 |
|  |  | Plasticizer | Kind | 3GO | 3GO |
|  |  |  | Parts by weight | 40 | 40 |
|  |  | Heat shielding particles | Kind | CWO particle | CWO particle |
|  |  |  | % by weight | 0.04 | 0.08 |
|  |  | Thickness | μm | 772 | 772 |
|  |  | A650/A550 of laminate | — | 0.9 | 0.9 |
|  |  | A650/A450 of laminate | — | 0.9 | 0.9 |
|  |  | A550/A450 of laminate | — | 0.9 | 0.9 |
|  |  | Visible light transmittance of laminate | % | 84.0 | 79.9 |
|  | Infrared reflective layer | Kind |  | Ultra-multilayer resin film | Ultra-multilayer resin film |
|  | Colored layer | Thermoplastic resin | Kind | PVB | PVB |
|  |  |  | Parts by weight | 100 | 100 |
|  |  | Plasticizer | Kind | 3GO | 3GO |
|  |  |  | Parts by weight | 40 | 40 |
|  |  | Coloring agent | Kind | Carbon black | Carbon black |
|  |  |  | % by weight | 0.095 | 0.001 |

TABLE 6-continued

|  |  |  | Comparative Example 12 | Comparative Example 13 |
|---|---|---|---|---|
|  | Thickness | μm | 787 | 777 |
|  | A650/A550 of laminate | — | 0.9 | 1.4 |
|  | A650/A450 of laminate | — | 0.8 | 1.3 |
|  | A550/A450 of laminate | — | 0.9 | 0.9 |
|  | Visible light transmittance of laminate | % | 1.9 | 78.6 |
|  | Second lamination glass member (interior side of vehicle) | Kind | Clear glass | Clear glass |
| Evaluation | Visible light transmittance | % | 1.5 | 69.3 |
|  | Solar transmittance | % | 4.3 | 35.6 |
| Transmitted color | Transmission a* | — | −4.0 | −4.8 |
|  | Transmission b* | — | 2.9 | 3.4 |
| Coloring of reflected light | Reflection a* | — | 2.1 | 3.1 |
|  | Reflection b* | — | −7.1 | −4.8 |
|  | Coloring of water droplet | Determination | x | x |

Note that a laminated glass was evaluated in which clear glass having a flat surface was used. Similar evaluation results are obtained when the interlayer film in Examples is used to obtain a laminated glass having a protruded surface that is the outer surface of the first lamination glass member.

EXPLANATION OF SYMBOLS

1: First lamination glass member
2: Second lamination glass member
3, 3A: Interlayer film
3a, 3Aa: First surface
3b, 3Ab: Second surface
11, 11A: Laminated glass for vehicle
31: Infrared reflective layer
31a: First surface
31b: Second surface
32: Colored layer
32a: Outer surface
33: Resin layer
33a: Outer surface

The invention claimed is:

1. A laminated glass for vehicle, the laminated glass comprising:
a first lamination glass member to be arranged at an exterior side of a vehicle;
a second lamination glass member to be arranged at an interior side of a vehicle; and
an interlayer film arranged between the first lamination glass member and the second lamination glass member,
the interlayer film having a colored layer containing a coloring agent, an infrared reflective layer that reflects an infrared ray and a resin layer containing a thermoplastic resin,
the colored layer being arranged on a first surface side of the infrared reflective layer, and the resin layer being arranged on a second surface side opposite to the first surface of the infrared reflective layer,
the colored layer being arranged closer to the first lamination glass member than the infrared reflective layer is in the interlayer film, and the resin layer being arranged closer to the second lamination glass member than the infrared reflective layer is in the interlayer film,
the infrared reflective layer being a resin film with a metal foil, a multilayer laminated film in which a metal layer and a dielectric layer are formed on a resin layer, a multilayer resin film, or a liquid crystal film,
the laminated glass having the colored layer, the infrared reflective layer and the resin layer at a center along a longitudinal axis and at a center along a transverse axis of the laminated glass for vehicle,
the laminated glass satisfying a first configuration,
the first configuration in which when the colored layer is sandwiched between two layers of clear glass to obtain a laminate, the colored layer satisfies both a configuration A and a configuration B,
the configuration A in which the laminate has an absorbance represented by $A_{650}$ at a wavelength of 650 nm, an absorbance represented by $A_{550}$ at a wavelength of 550 nm, and an absorbance represented by $A_{450}$ at a wavelength of 450 nm so that values of $A_{650}/A_{550}$, $A_{650}/A_{450}$, and $A_{550}/A_{450}$ are each 0.6 or more and 1.4 or less,
the configuration B in which the laminate has a visible light transmittance of 7.1% or more and 20% or less.

2. The laminated glass for vehicle according to claim 1, further satisfying a second configuration,
the second configuration in which the colored layer contains carbon black as the coloring agent.

3. The laminated glass for vehicle according to claim 1, wherein the colored layer contains a thermoplastic resin.

4. The laminated glass for vehicle according to claim 1, having a portion in which the laminated glass for vehicle has an absorbance represented by $A_{650}'$ at a wavelength of 650 nm, an absorbance represented by $A_{550}'$ at a wavelength of 550 nm, and an absorbance represented by $A_{450}'$ at a wavelength of 450 nm so that values of $A_{650}'/A_{550}'$, $A_{650}'/A_{450}'$, and $A_{550}'/A_{450}'$ are each 0.6 or more and 1.4 or less, the portion having a plane area of 30% or more of 100% of a total plane area of the laminated glass for vehicle.

5. The laminated glass for vehicle according to claim 1, having an absorbance represented by $A_{650}'$ at a wavelength of 650 nm, an absorbance represented by $A_{550'}$ at a wavelength of 550 nm, and an absorbance represented by $A_{450}'$ at a wavelength of 450 nm so that values of $A_{650}'/A_{550}'$, $A_{650}'/A_{450}'$, and $A_{550}'/A_{450}'$ are each 0.6 or more and 1.4 or less at a center along a longitudinal axis and at a center along a transverse axis of the laminated glass for vehicle.

6. The laminated glass for vehicle according to claim 1, having a protruded surface,
the protruded surface being an outer surface of the first lamination glass member.

7. The laminated glass for vehicle according to claim 1, wherein the colored layer satisfies both the configuration A and a configuration B1,
   the configuration B1 in which the laminate has a visible light transmittance of 17% or more and 20% or less.

8. A vehicle comprising a vehicle body and the lamination glass for vehicle according to claim 1.

* * * * *